United States Patent
Ahn

(10) Patent No.: US 11,490,077 B2
(45) Date of Patent: *Nov. 1, 2022

(54) IMAGE ENCODING/DECODING METHOD AND APPARATUS INVOLVING MERGE CANDIDATE LIST AND TRIANGULAR SHAPE PARTITIONS

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/255,625

(22) PCT Filed: Jun. 27, 2019

(86) PCT No.: PCT/KR2019/007821
§ 371 (c)(1),
(2) Date: Dec. 23, 2020

(87) PCT Pub. No.: WO2020/004979
PCT Pub. Date: Jan. 2, 2020

(65) Prior Publication Data
US 2021/0274162 A1    Sep. 2, 2021

Related U.S. Application Data

(60) Provisional application No. 62/697,982, filed on Jul. 13, 2018.

(30) Foreign Application Priority Data

Jun. 27, 2018  (KR) .................. 10-2018-0074255
Jul. 10, 2018  (KR) .................. 10-2018-0079891
(Continued)

(51) Int. Cl.
*H04N 19/105*  (2014.01)
*H04N 19/119*  (2014.01)
(Continued)

(52) U.S. Cl.
CPC ......... *H04N 19/105* (2014.11); *H04N 19/119* (2014.11); *H04N 19/139* (2014.11);
(Continued)

(58) Field of Classification Search
CPC .... H04N 19/105; H04N 19/46; H04N 19/119; H04N 19/176; H04N 19/139; H04N 19/51; H04N 19/573; H04N 19/182
See application file for complete search history.

(56) References Cited

U.S. PATENT DOCUMENTS

2010/0208818 A1* 8/2010 Yin .................. H04N 19/13
375/240.15
2013/0202037 A1* 8/2013 Wang .............. H04N 19/577
375/240.15
(Continued)

FOREIGN PATENT DOCUMENTS

KR   20140064944 A   5/2014
KR   20160143583 A   12/2016
(Continued)

OTHER PUBLICATIONS

Yongjo Ahn, Joint Video Exploration Team (JVET), Document: JVET-H0087, Diagonal Motion Partitions on Top of QTBT Block Structure, Oct. 18, 2017, 7 pgs.
(Continued)

*Primary Examiner* — Francis Geroleo
(74) *Attorney, Agent, or Firm* — Morgan, Lewis & Bockius LLP

(57) ABSTRACT

An image encoding/decoding apparatus according to the present invention can configure a merge candidate list of a
(Continued)

current block to which a diagonal motion partition is applied, derive the motion information of the current block on the basis of the merge candidate list and a merge candidate index, and perform inter-prediction on the current block on the basis of the derived motion information.

8 Claims, 14 Drawing Sheets

(30) Foreign Application Priority Data

Jul. 16, 2018 (KR) .................. 10-2018-0082348
Oct. 11, 2018 (KR) .................. 10-2018-0120959

(51) Int. Cl.
| | | |
|---|---|---|
| *H04N 19/139* | (2014.01) | |
| *H04N 19/176* | (2014.01) | |
| *H04N 19/182* | (2014.01) | |
| *H04N 19/46* | (2014.01) | |
| *H04N 19/51* | (2014.01) | |
| *H04N 19/573* | (2014.01) | |

(52) U.S. Cl.
CPC ......... *H04N 19/176* (2014.11); *H04N 19/182* (2014.11); *H04N 19/46* (2014.11); *H04N 19/51* (2014.11); *H04N 19/573* (2014.11)

(56) References Cited

U.S. PATENT DOCUMENTS

| | | | |
|---|---|---|---|
| 2015/0163494 A1* | 6/2015 | Park ................. | H04N 19/61 |
| | | | 375/240.02 |
| 2017/0180748 A1* | 6/2017 | Zhou ................ | H04N 19/109 |
| 2020/0275092 A1* | 8/2020 | Kang ................ | H04N 19/54 |

FOREIGN PATENT DOCUMENTS

| | | | | |
|---|---|---|---|---|
| WO | WO-2009051668 A2 * | 4/2009 | ........... | H04N 19/176 |
| WO | WO 2013/070001 A1 | 5/2013 | | |
| WO | WO 2017/183751 A1 | 10/2017 | | |

OTHER PUBLICATIONS

International Search Report, PCT/KR2019/007821, dated Oct. 14, 2019, 9 pgs.

* cited by examiner

【FIG. 3】
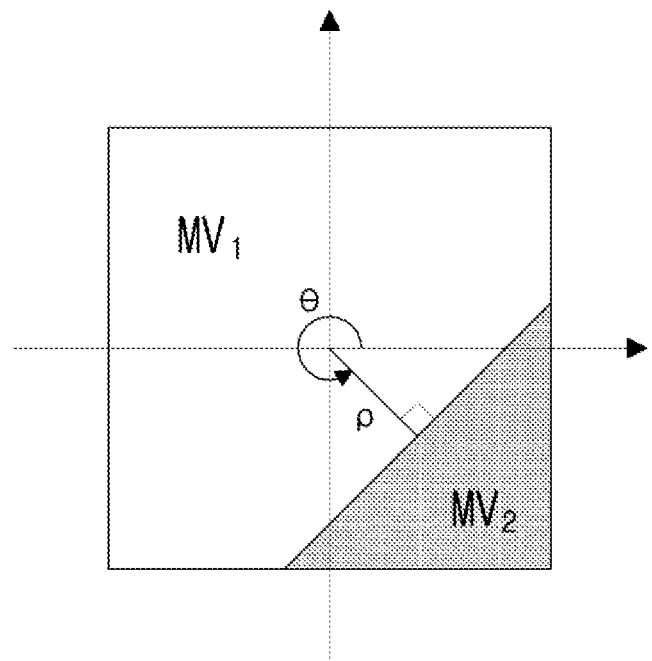
【FIG. 4】
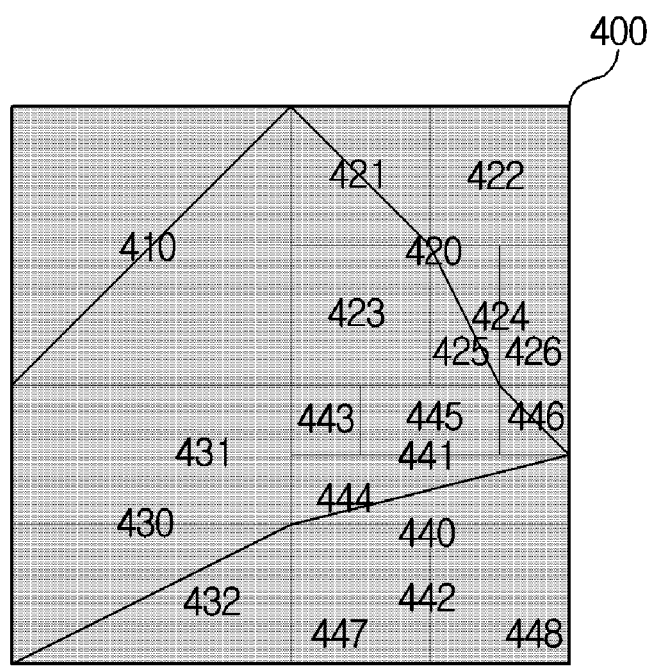

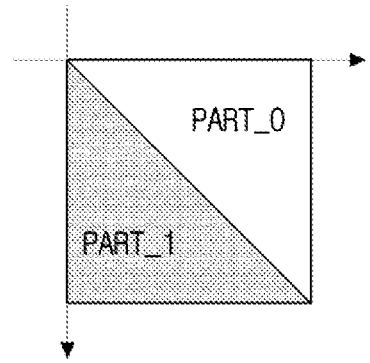
FIG. 5A
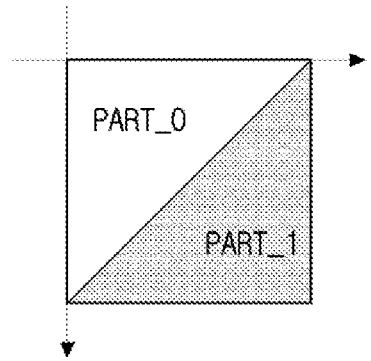
FIG. 5B
【FIG. 6】
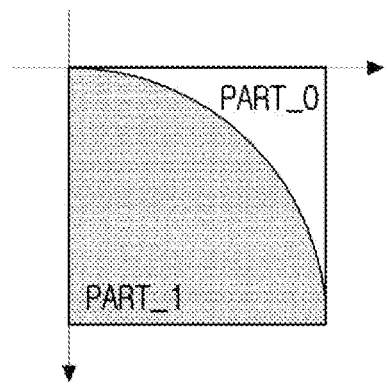
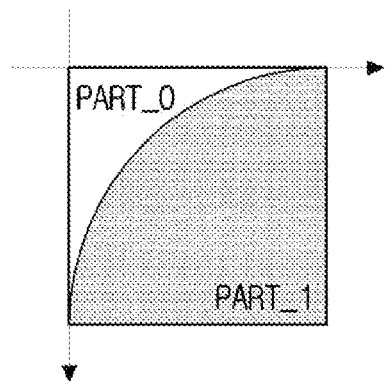
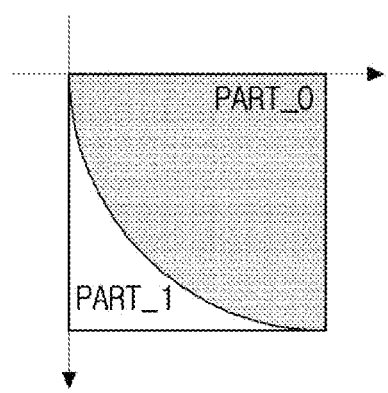
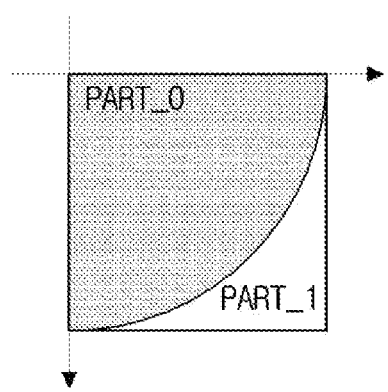

【FIG. 7】
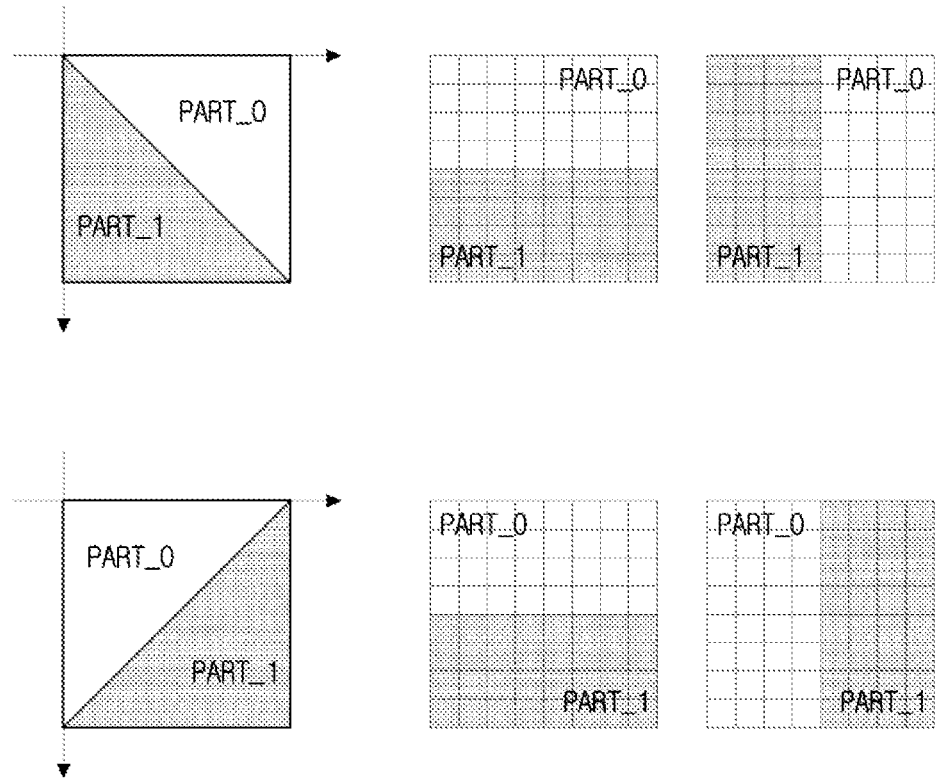
【FIG. 8】
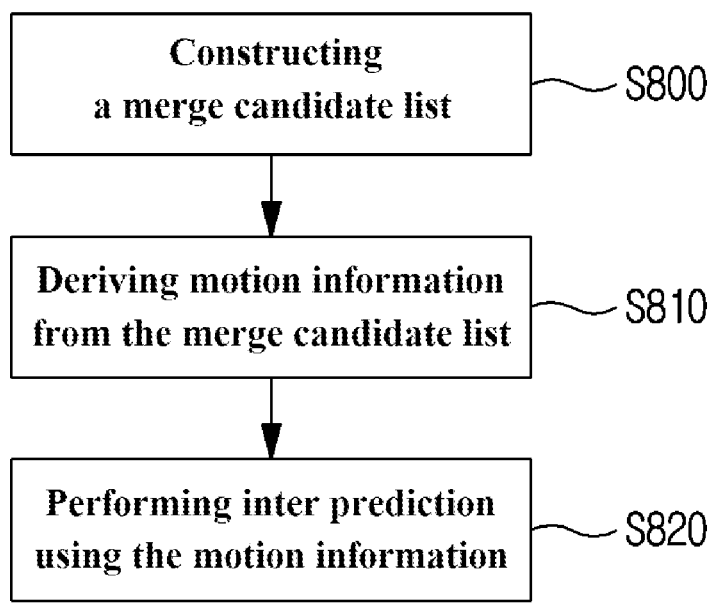

[FIG. 9]
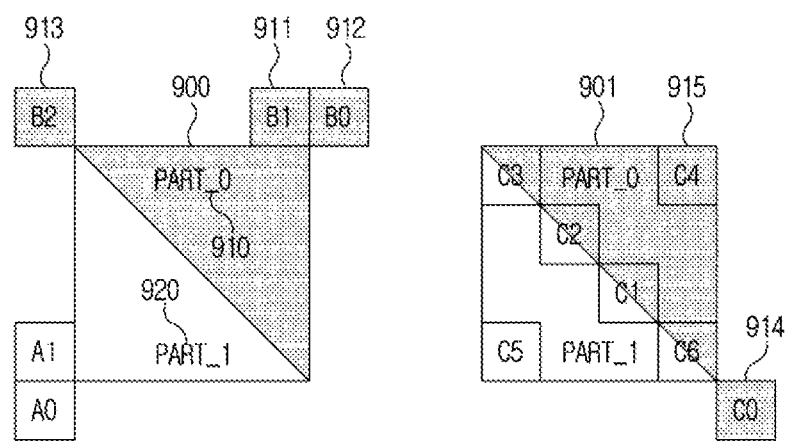
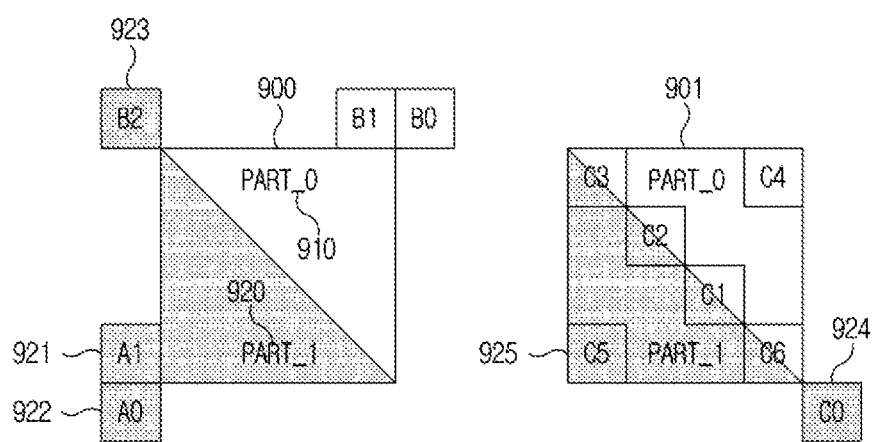

[FIG. 10]
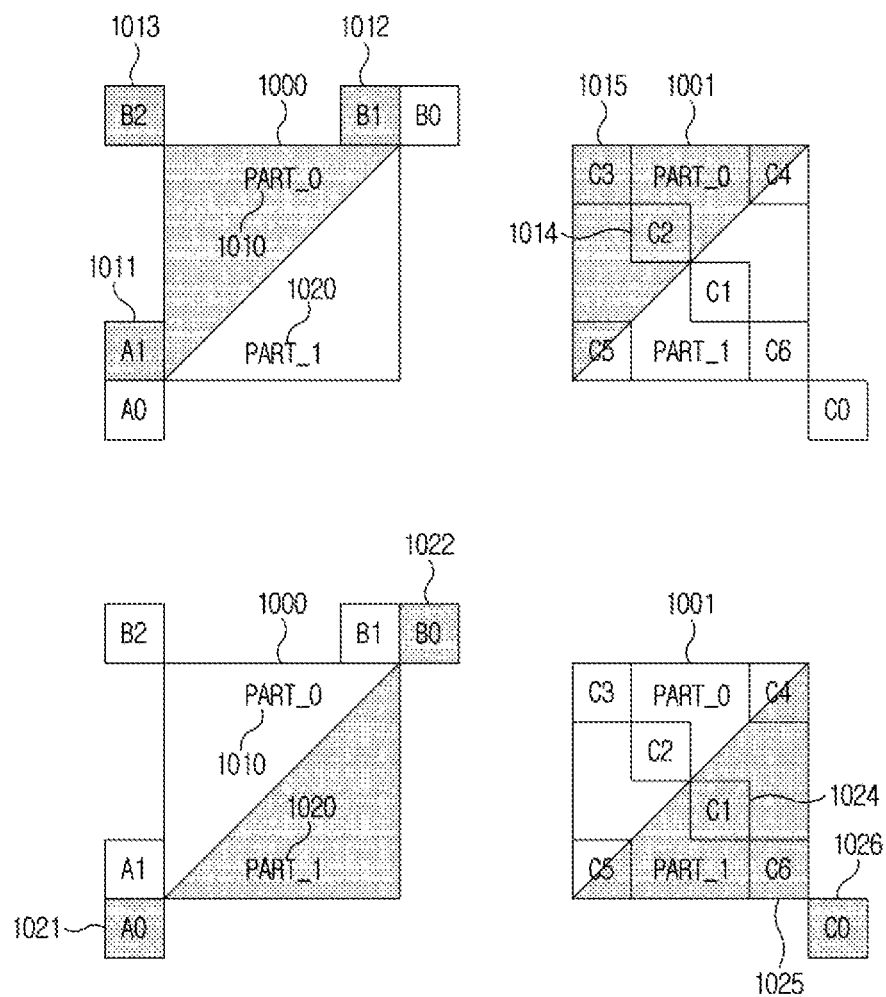

【FIG. 14】

| 2 | 2 | 2 | 2 | 2 | 2 | 2 | 2 | 2 | 2 | 2 | 2 | 2 | 1 | 1 |
|---|---|---|---|---|---|---|---|---|---|---|---|---|---|---|
| 2 | 2 | 2 | 2 | 2 | 2 | 2 | 2 | 2 | 2 | 2 | 2 | 1 | 1 | 0 | 0 |
| 2 | 2 | 2 | 2 | 2 | 2 | 2 | 2 | 2 | 2 | 2 | 1 | 1 | 0 | 0 | 0 |
| 2 | 2 | 2 | 2 | 2 | 2 | 2 | 2 | 1 | 1 | 0 | 0 | 0 | 0 | 0 |
| 2 | 2 | 2 | 2 | 2 | 2 | 1 | 1 | 0 | 0 | 0 | 0 | 0 | 0 | 0 |
| 2 | 2 | 2 | 2 | 1 | 1 | 0 | 0 | 0 | 0 | 0 | 0 | 0 | 0 | 0 |
| 2 | 2 | 1 | 1 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 1 | 1 |
|---|---|---|---|---|---|---|---|---|---|---|---|---|---|---|
| 0 | 0 | 0 | 0 | 0 | 0 | 0 | 0 | 0 | 0 | 0 | 0 | 1 | 1 | 2 | 2 |
| 0 | 0 | 0 | 0 | 0 | 0 | 0 | 0 | 0 | 0 | 1 | 1 | 2 | 2 | 2 |
| 0 | 0 | 0 | 0 | 0 | 0 | 0 | 0 | 1 | 1 | 2 | 2 | 2 | 2 | 2 |
| 0 | 0 | 0 | 0 | 0 | 0 | 1 | 1 | 2 | 2 | 2 | 2 | 2 | 2 | 2 |
| 0 | 0 | 0 | 0 | 1 | 1 | 2 | 2 | 2 | 2 | 2 | 2 | 2 | 2 | 2 |
| 0 | 0 | 1 | 1 | 2 | 2 | 2 | 2 | 2 | 2 | 2 | 2 | 2 | 2 | 2 |
| 1 | 1 | 2 | 2 | 2 | 2 | 2 | 2 | 2 | 2 | 2 | 2 | 2 | 2 | 2 |

| 32 | 32 | 32 | 32 | 32 | 32 | 32 | 32 | 32 | 32 | 31 | 31 | 28 | 28 | 16 | 16 |
|----|----|----|----|----|----|----|----|----|----|----|----|----|----|----|----|
| 32 | 32 | 32 | 32 | 32 | 32 | 32 | 32 | 31 | 31 | 28 | 28 | 16 | 16 | 4  | 4  |
| 32 | 32 | 32 | 32 | 32 | 32 | 31 | 31 | 28 | 28 | 16 | 16 | 4  | 4  | 1  | 1  |
| 32 | 32 | 32 | 32 | 31 | 31 | 28 | 28 | 16 | 16 | 4  | 4  | 1  | 1  | 0  | 0  |
| 32 | 32 | 31 | 31 | 28 | 28 | 16 | 16 | 4  | 4  | 1  | 1  | 0  | 0  | 0  | 0  |
| 31 | 31 | 28 | 28 | 16 | 16 | 4  | 4  | 1  | 1  | 0  | 0  | 0  | 0  | 0  | 0  |
| 28 | 28 | 16 | 16 | 4  | 4  | 1  | 1  | 0  | 0  | 0  | 0  | 0  | 0  | 0  | 0  |
| 16 | 16 | 4  | 4  | 1  | 1  | 0  | 0  | 0  | 0  | 0  | 0  | 0  | 0  | 0  | 0  |

| 0  | 0  | 0  | 0  | 0  | 0  | 0  | 0  | 0  | 0  | 1  | 1  | 4  | 4  | 16 | 16 |
|----|----|----|----|----|----|----|----|----|----|----|----|----|----|----|----|
| 0  | 0  | 0  | 0  | 0  | 0  | 0  | 0  | 1  | 1  | 4  | 4  | 16 | 16 | 28 | 28 |
| 0  | 0  | 0  | 0  | 0  | 0  | 1  | 1  | 4  | 4  | 16 | 16 | 28 | 28 | 31 | 31 |
| 0  | 0  | 0  | 0  | 1  | 1  | 4  | 4  | 16 | 16 | 28 | 28 | 31 | 31 | 32 | 32 |
| 0  | 0  | 1  | 1  | 4  | 4  | 16 | 16 | 28 | 28 | 31 | 31 | 32 | 32 | 32 | 32 |
| 1  | 1  | 4  | 4  | 16 | 16 | 28 | 28 | 31 | 31 | 32 | 32 | 32 | 32 | 32 | 32 |
| 4  | 4  | 16 | 16 | 28 | 28 | 31 | 31 | 32 | 32 | 32 | 32 | 32 | 32 | 32 | 32 |
| 16 | 16 | 28 | 28 | 31 | 31 | 32 | 32 | 32 | 32 | 32 | 32 | 32 | 32 | 32 | 32 |

PART_0

PART_1

FIG. 17A LEFT DIAGONAL

PART_0

PART_1

FIG 17B RIGHT DIAGONAL

IMAGE ENCODING/DECODING METHOD AND APPARATUS INVOLVING MERGE CANDIDATE LIST AND TRIANGULAR SHAPE PARTITIONS

TECHNICAL FIELD

The present disclosure relates to a video encoding/decoding method and apparatus.

BACKGROUND ART

As the market demand for high-resolution video is increasing, technology that can efficiently compress the high-resolution video is required. In response to the market demand, Moving Picture Expert Group (MPEG) of ISO/IEC and Video Coding Expert Group (VCEG) of ITU-T jointly formed Joint Collaborative Team on Video Coding (JCT-VC) to complete development of High Efficiency Video Coding (HEVC) video compression standard in January 2013, and have been actively conducting research and development on the next generation compression standard.

Video compression is largely composed of intra prediction, inter prediction, transformation, quantization, entropy coding, and in-loop filtering. Meanwhile, as demands for high-resolution video increase, demands for 3D video contents as a new video service are also increasing. Discussion on a video compression technique to effectively provide high-resolution and ultra-high-resolution 3D video contents is ongoing.

DISCLOSURE

Technical Problem

An object of the present disclosure is to provide a video encoding/decoding method and apparatus with improved efficiency.

In addition, an object of the present disclosure is to provide a method and an apparatus for dividing a coding block into rectangular, triangular, or arbitrary shape partitions.

In addition, an object of the present disclosure is to provide a method and an apparatus for adaptively constructing a merge candidate list of a current block.

An object of the present disclosure is to provide a method and an apparatus for limiting a prediction direction of a block to which diagonal motion division is applied.

In addition, an object of the present disclosure is to provide a method and an apparatus for weighted prediction of a block to which diagonal motion division is applied.

In addition, an object of the present disclosure is to provide a method and an apparatus for storing motion information of a block to which diagonal motion division is applied.

In addition, an object of the present disclosure is to provide a computer-readable recording medium for storing a bitstream generated by the video encoding method/apparatus.

Technical Solution

An image decoding method and apparatus according to the present disclosure may construct a merge candidate list of a current block, derive motion information of the current block based on the merge candidate list and a merge candidate index, and perform inter prediction of the current block based on the derived motion information.

In the image decoding method and apparatus according to the present disclosure, the current block may be divided into a first partition and a second partition based on diagonal motion division.

In the image decoding method and apparatus according to the present disclosure, at least one of the first partition or the second partition may have a triangular shape.

In the image decoding method and apparatus according to the present disclosure, the merge candidate index may be signaled for at least one of the first partition or the second partition.

In the image decoding method and apparatus according to the present disclosure, the merge candidate index may be signaled when a predetermined flag is a first value, and the flag may indicate whether the current block performs motion compensation based on the diagonal motion division.

In the image decoding method and apparatus according to the present disclosure, a value of the flag may be derived from a decoding apparatus based on a predetermined coding parameter.

In the image decoding method and apparatus according to the present disclosure, the coding parameter may include at least one of a slice type to which the current block belongs, an inter mode type of the current block, or a size of the current block.

In the image decoding method and apparatus according to the present disclosure, the merge candidate list may include at least one of a spatial merge candidate, a temporal merge candidate, a combined merge candidate, or a merge candidate having a zero motion vector.

In the image decoding method and apparatus according to the present disclosure, motion information of the partition may be derived based on motion information of a merge candidate specified by the merge candidate index.

In the image decoding method and apparatus according to the present disclosure, when the merge candidate has motion information for bidirectional prediction, the partition may be limited to have only motion information for unidirectional prediction.

In the image decoding method and apparatus according to the present disclosure, a pixel of the current block may be predicted by applying predetermined weights (m and n) to a pixel belonging to a reference block of the first partition and a pixel belonging to a reference block of the second partition.

In the image decoding method and apparatus according to the present disclosure, the m and n may be any one of 0, 1, 2, 4, 6, 7, 8, 16, 28, 31 or 32, and a sum of the m and n may be any one of 2, 8 or 32.

In the image decoding method and apparatus according to the present disclosure, the weights may be determined based on a position of the pixel of the current block.

Advantageous Effects

According to the present disclosure, encoding/decoding efficiency may be improved through block division of various types.

In addition, the present disclosure can improve encoding/decoding efficiency of motion information by using an adaptive merge candidate list.

According to the present disclosure, memory bandwidth can be efficiently reduced by limiting a prediction direction of a block to which diagonal motion division is applied.

In addition, the present disclosure can reduce artifacts near division boundaries through weighted prediction of a block to which diagonal motion division is applied.

In addition, accessibility of motion information and reliability as reference information can be improved through a motion information storage method according to the present disclosure.

In addition, according to the present disclosure, a computer-readable recording medium for storing a bitstream generated by an image encoding method/apparatus according to the present disclosure may be provided.

DESCRIPTION OF DRAWINGS

FIG. 3 is an embodiment of a method for dividing a block in an arbitrary form using one line segment.

FIG. 4 is a diagram showing an example of block division into various arbitrary shapes that can be generated using square and non-square block divisions and left and right diagonal line segments.

FIG. 5 shows a method of dividing a square or non-square block into triangular shapes using two types of diagonal lines proposed in the present disclosure.

FIG. 6 is a diagram illustrating a concept of a mask related to division of a circle or ellipse shape among embodiments of a mask for mask-based motion prediction and compensation proposed in the present disclosure.

FIG. 7 is a diagram illustrating a form of storing encoding information of a corresponding block when diagonal motion division is used.

FIG. 8 is a diagram illustrating a merge mode-based inter prediction method according to an embodiment to which the present disclosure is applied.

FIG. 9 shows merge candidates of a block using left diagonal motion division.

FIG. 10 shows merge candidates of a block using right diagonal motion division.

FIGS. 14 to 17 are diagrams illustrating a weighted prediction method for a current block to which diagonal motion division is applied as an embodiment to which the present disclosure is applied.

BEST MODE FOR INVENTION

Figure 1:
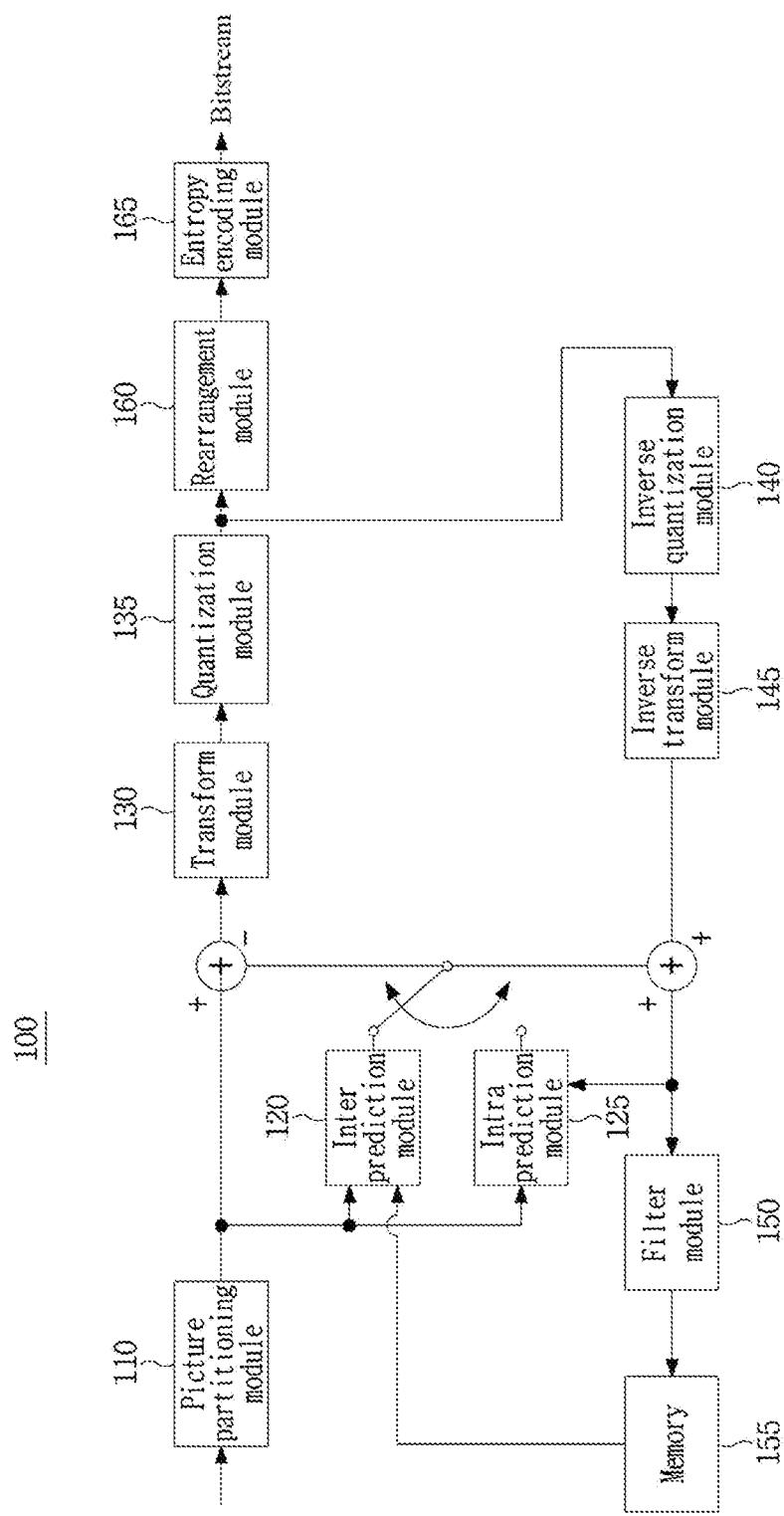
FIG. 1 is a block diagram showing a video encoding apparatus according to the present disclosure.

An image decoding method and apparatus according to the present disclosure may construct a merge candidate list of a current block, derive motion information of the current block based on the merge candidate list and a merge candidate index, and perform inter prediction of the current block based on the derived motion information.

In the image decoding method and apparatus according to the present disclosure, the current block may be divided into a first partition and a second partition based on diagonal motion division.

In the image decoding method and apparatus according to the present disclosure, at least one of the first partition or the second partition may have a triangular shape.

In the image decoding method and apparatus according to the present disclosure, the merge candidate index may be signaled for at least one of the first partition or the second partition.

In the image decoding method and apparatus according to the present disclosure, the merge candidate index may be signaled when a predetermined flag is a first value, and the flag may indicate whether the current block performs motion compensation based on the diagonal motion division.

In the image decoding method and apparatus according to the present disclosure, a value of the flag may be derived from a decoding apparatus based on a predetermined coding parameter.

In the image decoding method and apparatus according to the present disclosure, the coding parameter may include at least one of a slice type to which the current block belongs, an inter mode type of the current block, or a size of the current block.

In the image decoding method and apparatus according to the present disclosure, the merge candidate list may include at least one of a spatial merge candidate, a temporal merge candidate, a combined merge candidate, or a merge candidate having a zero motion vector.

In the image decoding method and apparatus according to the present disclosure, motion information of the partition may be derived based on motion information of a merge candidate specified by the merge candidate index.

In the image decoding method and apparatus according to the present disclosure, when the merge candidate has motion information for bidirectional prediction, the partition may be limited to have only motion information for unidirectional prediction.

In the image decoding method and apparatus according to the present disclosure, a pixel of the current block may be predicted by applying predetermined weights (m and n) to a pixel belonging to a reference block of the first partition and a pixel belonging to a reference block of the second partition.

In the image decoding method and apparatus according to the present disclosure, the m and n may be any one of 0, 1, 2, 4, 6, 7, 8, 16, 28, 31 or 32, and a sum of the m and n may be any one of 2, 8 or 32.

In the image decoding method and apparatus according to the present disclosure, the weights may be determined based on a position of the pixel of the current block.

MODE FOR INVENTION

An embodiment of the present disclosure will be described in detail with reference to the accompanying drawings in the present specification so that those of ordinary skill in the art can easily implement the present disclosure. However, the present disclosure may be implemented in various different forms, and is not limited to the embodiments described herein. In the drawings, parts irrelevant to the description are omitted in order to clearly describe the present disclosure, and similar reference numerals are assigned to similar parts throughout the specification.

Throughout the specification, when a certain part is said to be 'connected' with another part, this includes not only the case where it is directly connected with another element in the middle, but also the case where it is electrically connected with another element in the middle.

In addition, throughout the specification, when a certain part 'includes' a certain component, it means that other components may be further included rather than excluding other components unless otherwise stated.

In addition, terms such as 'first' and 'second' may be used to describe various components, but components should not be limited by the terms. These terms are used only for the purpose of distinguishing one component from another component.

In addition, in the embodiments of the apparatus and method described herein, a part of configurations of the apparatus or a part of steps of the method may be omitted. In addition, an order of a part of configurations of the apparatus or a part of steps of the method may be changed. In addition, other configurations or other steps may be inserted into a part of configurations of the apparatus or a part of steps of the method.

In addition, some configurations or some steps of a first embodiment of the present disclosure may be added to a second embodiment of the present disclosure, or may replace some configurations or some steps of the second embodiment.

In addition, constituent units shown in the embodiment of the present disclosure are shown independently to represent different characteristic functions, and does not mean that each constituent unit is formed of separate hardware or a single software constituent unit. In other words, constituent units are described by being listed as a respective constituent unit for convenience of description, and at least two constituent units of constituent units are combined to form one constituent unit, or one constituent unit may be divided into a plurality of constituent units to perform a function. Integrated embodiments and separate embodiments of constituent units are also included in the scope of the present disclosure unless departing from an essence of the present disclosure.

First, a brief description of terms used in the present application are as follows.

Hereinafter, a video decoding apparatus that will be described later may be an apparatus included in a private security camera, a private security system, a military security camera, a military security system, a personal computer (PC), a notebook computer, a portable multimedia player (PMP), a wireless communication terminal, a smart phone, a server terminal such as a TV application server, a service server, and the like. In addition, a video decoding apparatus may mean An apparatus including a user terminal such as various devices, a communication device such as a communication modem for communication through wired/wireless communication networks, a memory for storing data and various programs for inter or intra prediction in order to encode or decode a video, a microprocessor for performing operation and control by executing programs, or the like.

In addition, a video encoded in a bitstream by a encoding apparatus may be transmitted in real time or non-real time to a video decoding apparatus through a wired/wireless communication network such as internet, a near-field communication network, a wireless local area network (LAN), a WiBro network, and a mobile communication network, or various communication interfaces such as a cable, and a universal serial bus (USB), and may be decoded, reconstructed as an image, and reproduced. Alternatively, a bitstream generated by an encoder may be stored in a memory. The memory may include both volatile memory and non-volatile memory. In this specification, a memory may be expressed as a recording medium storing a bitstream.

Generally, a video may be composed of a series of pictures, and each of the pictures may be divided into coding units such as blocks. In addition, it will be understood by those of ordinary skill in the technical field to which the present embodiment belongs that the term 'picture' described below may be substituted with other terms having the equivalent meaning such as an image and a frame. In addition, it will be understood by those of ordinary skill in the art that the term 'coding unit' may be substituted with other terms having the equivalent meaning such as a unit block and a block.

Hereinafter, exemplary embodiments of the present disclosure will be described in more detail with reference to the accompanying drawings. In describing the present disclosure, duplicate descriptions of the same components will be omitted.

FIG. 1 is a block diagram showing a video encoding apparatus according to the present disclosure.

Referring to FIG. 1, a video encoding apparatus 100 may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

A picture partitioning module 110 may partition an input picture into one or more processing units. Herein, the processing unit may be a prediction unit (PU), a transform unit (TU), or a coding unit (CU). Hereinafter, in an embodiment of the present disclosure, a coding unit may be used as a unit that performs encoding or a unit that performs decoding.

A prediction unit may be resulting from dividing one coding unit into at least one square or non-square of the same size, and it may be divided such that one prediction unit among prediction units divided within one coding unit has a different shape and/or size from another prediction unit. When it is not a minimum coding unit in generating a prediction unit which performs intra prediction based on a coding unit, intra prediction may be performed without dividing the coding unit into a plurality of prediction units N×N.

Prediction modules 120 and 125 may include an inter prediction module 120 performing inter prediction and an intra prediction module 125 performing intra prediction. Whether to perform inter prediction or intra prediction for a prediction unit may be determined, and detailed information (e.g., an intra prediction mode, a motion vector, a reference picture, etc.) according to each prediction method may be determined. A residual value (residual block) between a generated prediction block and an original block may be input to a transform module 130. In addition, prediction mode information, motion vector information, etc. used for prediction may be encoded together with a residual value by an entropy encoding module 165 and may be transmitted to a decoder.

When applying the block merge technology of the present disclosure described above, a method of using a merge estimation region (MER) in consideration of parallel processing may be applied to prediction modules 120 and 125 in merging and using motion information of a block adjacent to a current block spatially or temporally. In other words, the present disclosure may utilize a parallel estimation region (PER) for constructing a block spatially or temporally adjacent to a current block in consideration of parallel processing in a prediction technology such as inter prediction, intra prediction, and cross component prediction among video coding technologies.

A inter prediction module 120 may predict a prediction unit based on information of at least one of a previous picture or a subsequent picture of a current picture, or may predict a prediction unit based on information of some encoded regions in the current picture, in some cases. The inter prediction module 120 may include a reference picture interpolation module, a motion prediction module, and a motion compensation module.

A reference picture interpolation module may receive reference picture information from a memory 155 and may generate pixel information on an integer pixel or less than the integer pixel from the reference picture. In the case of luma pixels, an 8-tap DCT-based interpolation filter having different filter coefficients may be used to generate pixel information on an integer pixel or less than the integer pixel in a unit of a ¼ pixel. In the case of chroma signals, a 4-tap DCT-based interpolation filter having different filter coefficients may be used to generate pixel information on an integer pixel or less than the integer pixel in a unit of a pixel.

A motion prediction module may perform motion prediction based on a reference picture interpolated by a reference picture interpolation module. As a method for obtaining a motion vector, various methods such as a full search-based block matching algorithm (FBMA), a three step search (TSS), and a new three-step search algorithm (NTS) may be used. A motion vector may have a motion vector value in a unit of a pixel or a ¼ pixel based on an interpolated pixel. A motion prediction module may predict a current prediction unit by using various motion prediction methods. As a motion prediction method, various methods such as a skip method, a merge method, an Advanced Motion Vector Prediction (AMVP) method, and an intra block copy method may be used.

An intra prediction module 125 may generate a prediction unit based on reference pixel information neighboring to a current block which is pixel information in the current picture. When a neighboring block of a current prediction unit is a block on which inter prediction has been performed and a reference pixel is a pixel on which inter prediction has been performed, a reference pixel included in a block on which inter prediction has been performed may be replaced with reference pixel information of a neighboring block on which intra prediction has been performed. In other words, when a reference pixel is not available, information on a reference pixel that is not available may be replaced with at least one reference pixel among available reference pixels.

In addition, a residual block including residual information that is a difference between a prediction unit on which prediction has been performed based on the prediction unit generated by prediction modules 120 and 125 and an original block of the prediction unit may be generated. The generated residual block may be input to a transform module 130.

A transform module 130 may transform a residual block including residual information between an original block and a prediction unit generated by prediction modules 120 and 125 using a transform method such as discrete cosine transform (DCT), discrete sine transform (DST), and KLT. Whether to apply DCT, DST, or KLT in order to transform a residual block may be determined based on intra prediction mode information of a prediction unit used to generate a residual block.

A quantization module 135 may quantize values transformed to a frequency domain by a transform module 130. Quantization coefficients may vary depending on a block or importance of a picture. The values calculated by a quantization module 135 may be provided to an inverse quantization module 140 and a rearrangement module 160.

A rearrangement module 160 may rearrange coefficient values on quantized residual values.

A rearrangement module 160 may change coefficients in the form of a two-dimensional block into coefficients in the form of a one-dimensional vector through a coefficient scanning method. For example, a rearrangement module 160 may scan from DC coefficients to coefficients in a high frequency domain using zig-zag scanning method so as to change the coefficients to be in the form of a one-dimensional vector. Depending on a size of a transform unit and an intra prediction mode, vertical scanning where coefficients in the form of a two-dimensional block are scanned in a column direction or horizontal scanning where coefficients in the form of a two-dimensional block are scanned in a row direction may be used instead of zig-zag scanning. In other words, which scanning method among zig-zag scanning, vertical scanning, and horizontal scanning is used may be determined depending on a size of a transform unit and an intra prediction mode.

An entropy encoding module 165 may perform entropy encoding based on values calculated by a rearrangement module 160. Entropy encoding may use various encoding methods such as Exponential Golomb, Context-Adaptive Variable Length Coding (CAVLC), and Context-Adaptive Binary Arithmetic Coding (CABAC). In relation to this, an entropy encoding module 165 may encode residual value coefficient information of a coding unit from a rearrangement module 160 and prediction modules 120 and 125. In addition, according to the present disclosure, information indicating that motion information is derived and used at a decoder side and information on a technique used to derive motion information may be signaled and transmitted.

An inverse quantization module 140 and an inverse transform module 145 may inversely quantize values quantized by a quantization module 135 and inversely transform values transformed by a transform module 130. A residual value generated by an inverse quantization module 140 and an inverse transform module 145 may be combined with a prediction unit predicted through a motion prediction module, motion compensation module, and intra prediction module included in prediction modules 120 and 125 to generate a reconstructed block.

A filter module 150 may include at least one of a deblocking filter, an offset correction module, or an adaptive loop filter (ALF). A deblocking filter may remove block distortion that occurs due to boundaries between blocks in a reconstructed picture. An offset correction module may correct offset with respect to an original image in a unit of a pixel in a deblocking filtered image. In order to perform offset correction on a particular picture, a method of applying offset in consideration of edge information of each pixel or a method of partitioning pixels included in an image into the predetermined number of regions, determining a region to be subjected to perform offset, and applying the offset to the determined region may be used. Adaptive loop filtering (ALF) may be performed based on a value obtained by comparing a filtered reconstructed image and an original image. After partitioning pixels included in an image into predetermined groups, one filter to be applied to the corresponding group may be determined, and filtering may be performed differentially for each group.

A memory 155 may store a reconstructed block or picture calculated through a filter module 150. The stored reconstructed block or picture may be provided to prediction modules 120 and 125 in performing inter prediction.

Figure 2:
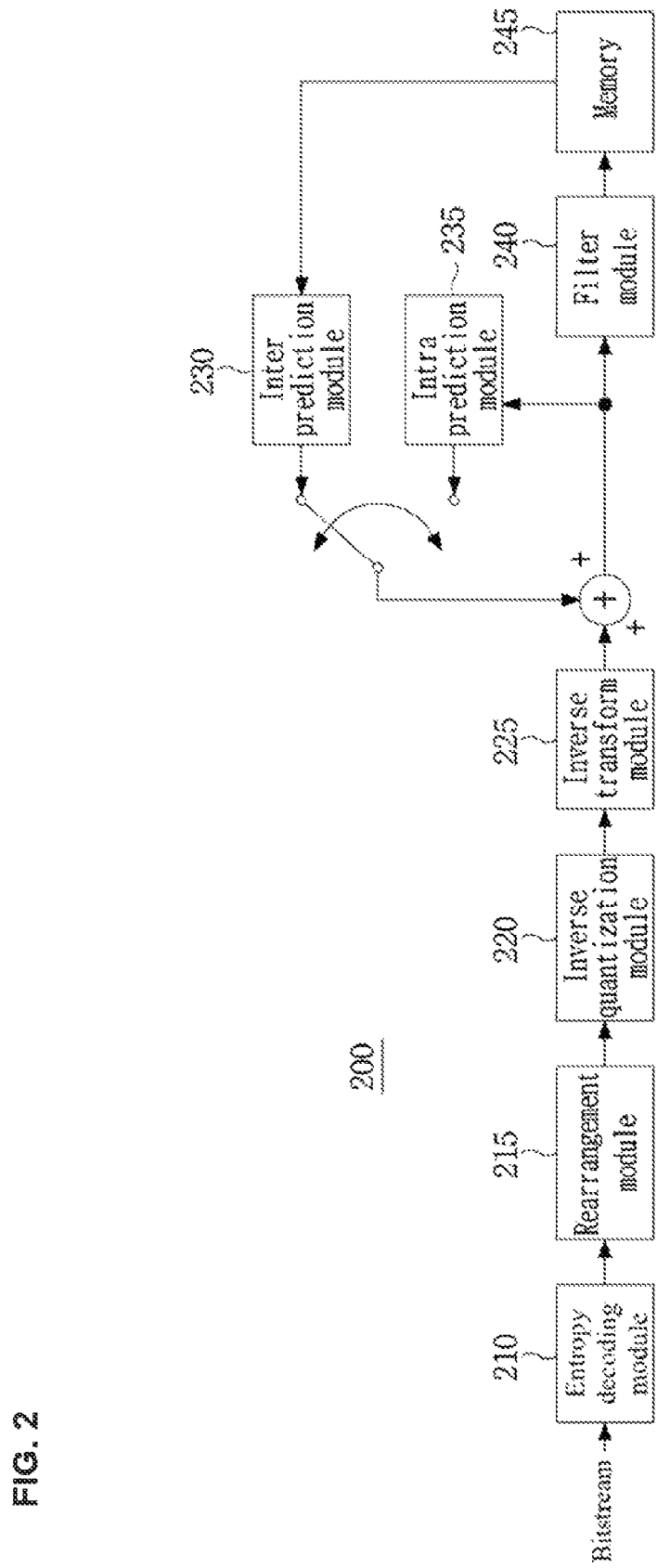
FIG. 2 is a block diagram showing a video decoding apparatus according to the present disclosure.

FIG. 2 is a block diagram showing an image decoding apparatus according to the present disclosure.

Referring to FIG. 2, a device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input to a device for decoding a video, the input bitstream may be decoded according to an inverse process of a device for encoding a video.

An entropy decoding module 210 may perform entropy decoding according to an inverse process of entropy encoding by an entropy encoding module of a video encoding apparatus. For example, corresponding to methods performed by a video encoding apparatus, various methods such as Exponential Golomb, Context-Adaptive Variable Length Coding (CAVLC), and Context-Adaptive Binary Arithmetic Coding (CABAC) may be applied.

An entropy decoding module 210 may decode information on intra prediction and inter prediction performed by an encoding apparatus.

A rearrangement module 215 may perform rearrangement on a bitstream entropy decoded by an entropy decoding module 210 based on a rearrangement method used in an encoding apparatus. A rearrangement module may reconstruct and rearrange coefficients in the form of a one-dimensional vector to coefficients in the form of a two-dimensional block.

An inverse quantization module 220 may perform inverse quantization based on a quantization parameter received from an encoding apparatus and rearranged coefficients of a block.

An inverse transform module 225 may perform inverse transform, i.e., inverse DCT, inverse DST, and inverse KLT, which corresponds to a transform, i.e., DCT, DST, and KLT, performed by a transform module, on a quantization result by a device for encoding a video. Inverse transform may be performed based on a transmission unit determined by a video encoding apparatus. In an inverse transform module 225 of a video decoding apparatus, transform schemes (e.g., DCT, DST, and KLT) may be selectively performed depending on multiple pieces of information such as a prediction method, a size of a current block, and a prediction direction.

Prediction modules 230 and 235 may generate a prediction block based on information on prediction block generation received from an entropy decoding module 210 and information on a previously decoded block or picture received from a memory 245.

As described above, if a size of a prediction unit and a size of a transform unit are the same when intra prediction is performed in the same manner as an operation of a video encoding apparatus, intra prediction may be performed on a prediction unit based on pixels existing on the left, upper left, and top of a prediction unit. However, if the size of the prediction unit and the size of the transform unit are different when the intra prediction is performed, intra prediction may be performed using a reference pixel based on a transform unit. In addition, intra prediction using N×N division may be used only for the minimum coding unit.

Prediction modules 230 and 235 may include a prediction unit determination module, an inter prediction module, and an intra prediction module. A prediction unit determination module may receive a variety of information, such as prediction unit information, prediction mode information of an intra prediction method, and information on motion prediction of an inter prediction method, from an entropy decoding module 210, may divide a current coding unit into prediction units, and may determine whether inter prediction or intra prediction is performed on the prediction unit.

When applying the block merge technology of the present disclosure described above, a method of using a merge estimation region (MER) in consideration of parallel processing may be applied to prediction modules 230 and 235 in merging and using motion information of a block adjacent to a current block spatially or temporally. In other words, the present disclosure may utilize a parallel estimation region (PER) for constructing a block spatially or temporally adjacent to a current block in consideration of parallel processing in a prediction technology such as inter prediction, intra prediction, and cross component prediction among video coding technologies.

An inter prediction module 230 may perform inter prediction on a current prediction unit based on information of at least one of a previous picture or a subsequent picture of the current picture including the current prediction unit using information required for inter prediction of the current prediction unit provided by a video encoding apparatus. In order to perform inter prediction, based on a coding block, it may be determined whether a motion prediction method of a prediction unit included in a corresponding coding unit is a skip mode, a merge mode, an AMVP mode, or an intra block copy mode.

An intra prediction module 235 may generate a prediction block based on pixel information in a current picture. When a prediction unit is a prediction unit subjected to intra prediction, intra prediction may be performed based on intra prediction mode information of the prediction unit received from a video encoding apparatus. An intra prediction module 235 may include an adaptive intra smoothing (AIS) filter, a reference pixel interpolation module, and a DC filter. An AIS filter performs filtering on a reference pixel of a current block, and whether to apply the filter may be determined depending on a prediction mode of a current prediction unit. AIS filtering may be performed on a reference pixel of a current block by using a prediction mode of a prediction unit and AIS filter information received from a device for encoding a video. When a prediction mode of a current block is a mode where AIS filtering is not performed, an AIS filter may not be applied.

When a prediction mode of a prediction unit is a prediction unit that performs intra prediction based on a pixel value interpolated by a reference pixel, a reference pixel interpolation module may interpolate a reference pixel to generate a reference pixel in a unit of pixel equal to an integer pixel or less than the integer pixel. When a prediction mode of a current prediction unit is a prediction mode in which a prediction block is generated without interpolating a reference pixel, a reference pixel may not be interpolated. A DC filter may generate a prediction block through filtering when a prediction mode of a current block is a DC mode.

A reconstructed block or picture may be provided to a filter module 240. A filter module 240 may include a deblocking filter, an offset correction module, and an ALF.

Information on whether a deblocking filter is applied to a corresponding block or picture and information on which of a strong filter and a weak filter is applied when the deblocking filter is applied may be received from a video encoding apparatus. A deblocking filter of a video decoding apparatus may receive information on a deblocking filter from a video encoding apparatus, and may perform deblocking filtering on a corresponding block.

An offset correction module may perform offset correction on a reconstructed image based on a type of offset correction and offset value information applied to an image in performing encoding. An ALF may be applied to a coding unit based on information on whether to apply the ALF, ALF coefficient information, etc. received from an encoding apparatus. The ALF information may be provided as being included in a particular parameter set.

A memory 245 may store a reconstructed picture or block for use as a reference picture or block, and may provide a reconstructed picture to an output module.

FIG. 3 is an embodiment of a method for dividing a block in an arbitrary form using one line segment.

FIG. 3 shows an embodiment of dividing one block into two blocks of different arbitrary shapes using one line segment.

In FIG. 3, one block 300 may be configured as a square or non-square block. In this case, the square or non-square block may be recursively divided into various tree types, and may be divided using quad-tree block division, binary-tree block division, and ternary-tree block division.

One block shown in FIG. 3 may be divided into two blocks of different arbitrary shapes using a line segment having a specific angle and distance based on an origin of the block. In this case, the angle and distance, which are parameters for indicating the line segment based on the origin of the block, may be signaled in a block unit.

FIG. 4 is a diagram showing an example of block division into various arbitrary shapes that can be generated using square and non-square block divisions and left and right diagonal line segments.

FIG. 4 shows an example in which blocks may be divided into various arbitrary shapes using only a left or right diagonal line segment in a block division structure using various tree types.

In FIG. 4, a block 400 is divided into blocks 410, 420, 430, and 440 using an initial quad-tree block division. Thereafter, the first block 410 of blocks divided by quad-tree block division may be divided into two triangular blocks using a diagonal line segment proposed in the present disclosure without using additional lower tree block division. In this case, the block 410 indicates that the block is divided by using a diagonal line connecting the top-right and the bottom-left of the block.

In FIG. 4, the second block 420 of the blocks divided by quad-tree block division may be divided into blocks 421, 422, 423, and 424 using quad-tree block division as additional lower tree block division. In this case, the block 421, which is a first lower block of the block 420, shows an example of dividing into two triangular blocks using a diagonal line segment proposed in the present disclosure without using additional lower tree block division. In this case, the block 421 indicates that the block is divided by using a diagonal line connecting the top-left and the bottom-right of the block.

The block 424, which is a fourth block among lower blocks of the second block 420, indicates that the block is divided into two non-square blocks 425 and 426 again using binary-tree block division. In this case, the block 425 represents an example in which the block is divided into two triangular blocks using a diagonal line segment proposed in the present disclosure, and it is shown that the block is divided using a diagonal line connecting the top-left and the bottom-right of the block.

In FIG. 4, the block 430, which is a third block among blocks divided by quad-tree block division, is divided into blocks 431 and 432 using binary-tree block division as additional lower tree block division.

Among the blocks above, the block 432, which is a second lower block of the block 430, does not use additional lower tree block division, is divided into two triangular blocks using a diagonal line segment proposed in the present disclosure, and shows that the block is divided using a diagonal line connecting the top-right and the bottom-left of the block.

FIG. 4, the fourth block 440 of the blocks divided by quad-tree block division is divided into blocks 441 and 442 using binary-tree block division as additional lower tree block division. Among the blocks above, the block 441, which is a first lower block of the block 440, is divided into blocks 443 and 444 using binary-tree block division as additional lower tree block division. Among the blocks above, the block 443 is shown to be divided into blocks 445, 446, and 447 using ternary-tree block division. In this case, the block 447 of the blocks divided using ternary-tree block division shows an example in which the block is divided into two triangular blocks by using a diagonal line connecting the top-left and the bottom-right of the block.

As described based on the embodiment shown in FIG. 4, even if only two types of diagonal lines consisting of a diagonal line connecting the top-left and the bottom-right of a block and a diagonal line connecting the top-right and the bottom-left of a block proposed in the present disclosure are used, when various block division structures such as quad-tree block division structure, binary-tree block division structure, and ternary-tree block division structure are used together, it is possible to express an arbitrary block division type, such as an arbitrary block division type using various angles and distances shown in FIG. 3.

FIG. 5 shows a method of dividing a square or non-square block into triangular shapes using two types of diagonal lines proposed in the present disclosure.

FIG. 5A shows an example of dividing a square or non-square block into two triangular blocks using a diagonal line connecting the top-left and the bottom-right of the block.

FIG. 5B shows an example of dividing a square or non-square block into two triangular blocks using a diagonal line connecting the top-right and the bottom-left of the block.

The two triangular blocks divided in FIGS. 5A and 5B may be referred to as a first partition and a second partition according to positions.

In FIG. 5A, a diagonal line connecting the top-left and the bottom-right of the block may be expressed as Equation 1 with a position of the top-left of the block as an origin.

$$f(x,y)=w*y-h*x \qquad \text{[Equation 1]}$$

In Equation 1, w is a width of a block, and h is a height of a block.

In FIG. 5B, a diagonal line connecting the top-right and the bottom-left of the block may be expressed as Equation 2 with a position of the top-left of the block as an origin.

$$f(x,y)=w*(h-y)-h*x \qquad \text{[Equation 2]}$$

In Equation 2, w is a width of a block, and h is a height of a block.

For the above-described diagonal motion division, a flag indicating whether diagonal motion division is performed for one coding unit (CU) may be used. For example, if the flag is a first value, diagonal motion division may be performed; otherwise, diagonal motion division may not be performed.

The flag may be encoded and signaled by an encoding device, or may be derived by a decoding device based on a predetermined coding parameter. Herein, the coding parameter may include a slice type, an inter mode type, a block size/shape, a ratio between a width and a height of a block, and the like.

For example, the flag may be set to the first value only when a slice type to which a current block belongs is a B slice. Alternatively, the flag may be set to the first value only when an inter mode of a current block is a merge mode. Alternatively, the flag may be set as the first value only when at least one of a width or a height of a current block is greater than or equal to a predetermined threshold size. Herein, the threshold size may be 4, 8, 16 or more. Alternatively, the flag may be set to the first value only when the number of samples (W*H) belonging to the current block is greater than or equal to a predetermined threshold number. Herein, the threshold number may be 32, 64 or more. Alternatively, the flag may be set to the first value only when a ratio of a width and a height of a current block is less than a predetermined threshold value. Herein, the threshold value may be 4, 8 or more.

When the flag indicates that diagonal motion division is performed, direction information of diagonal motion division may be signaled. When the direction information is the first value, a current block may be divided based on a diagonal line connecting the top-left and the bottom-right of the block; otherwise, a current block may be divided based on a diagonal line connecting the top-right and the bottom-left of the block.

The information for diagonal motion division may not be signaled according to mode information of a current block. In this case, it includes that the information for diagonal motion division may not be signaled when mode information of a current block is an intra prediction mode.

In addition, the information for diagonal motion division may not be signaled according to size information of a current block. The size information of the current block may be defined as a size of a width or height, a ratio of a width and a height, a product of a width and a height, etc. For example, when a width or height of a current block is less than 8, a current block may not use diagonal motion division.

Alternatively, as an additional embodiment, when a width or height of a current block is less than 8 or a ratio of a width and a height of a current block is greater than or equal to a specific ratio, diagonal motion division may not be used. The specific ratio means that when a ratio of a width and a height is greater than 1:3 or 3:1 (e.g., 1:4 or 4:1, 1:8 or 8:1), a current block may not use diagonal motion division. In such a case, diagonal motion division information is not signaled and a corresponding syntax is not parsed.

FIG. 6 is a diagram illustrating a concept of a mask related to division of a circle or ellipse shape among embodiments of a mask for mask-based motion prediction and compensation proposed in the present disclosure.

FIG. 6 shows an embodiment of a mask for mask-based motion prediction and compensation proposed in the present disclosure, it is shown that one block may be divided into two different regions by using a mask including a part of a circle or an ellipse.

In the case of the circle or ellipse type division, a boundary of the division may be smoothed by adjusting weights at the boundary, and a weighted prediction method described later may be applied in the same/similar manner.

According to an embodiment of the present disclosure, a corresponding block in a reference picture may be selected using motion information of a block spatially or temporally adjacent to a current block, and a shape of a mask may be determined based on a pixel configuration of a corresponding block.

In this case, using the pixel configuration of the corresponding block may mean configuring a mask to detect an edge inside the block and divide the block based on the edge.

FIG. 7 is a diagram illustrating a form of storing encoding information of a corresponding block when diagonal motion division is used.

Referring to FIG. 7, when using diagonal motion division, in storing encoding information of a corresponding block, encoding information may be stored by dividing the block in at least one of a horizontal direction or a vertical direction instead of a diagonally divided form.

Alternatively, when diagonal motion division is used, encoding information of a corresponding block may be stored in a diagonally divided shape. However, in a number of video coding methods and apparatuses, encoding information such as motion information is stored in a block unit of a specific size, such as a 4×4 block or an 8×8 block, without storing the encoding information in a pixel unit. The encoding information stored in this way may be used as reference information of a block to be encoded/decoded after a current block.

In addition, in the case of dividing using a left diagonal line (diagonal line connecting a top-left end and a bottom-right), a first partition may be referenced based on a top-right position of a current block, and a second partition may be referenced based on a bottom-left position of the current block.

On the other hand, in the case of division using a right diagonal line (diagonal line connecting a top-right and a bottom-left), a first partition may be referenced based on a top-left position of a current block, and a second partition may be referenced based on a bottom-right position of the current block.

According to an embodiment of the present disclosure, when motion vectors of a first partition and a second partition are stored in a motion vector buffer, an additional motion vector storage process may be included. In addition, a process of inferring a prediction direction may be included in a process of extracting motion from a motion vector buffer.

When a first partition and a second partition each perform unidirectional prediction, each partition may have only a motion vector in a L0 or L1 direction. In this case, the additional motion vector storage process may mean a process of constructing a motion vector for bidirectional prediction using motion vectors of each partition. A motion vector for bidirectional prediction includes a motion vector in a L0 direction and a motion vector in a L1 direction. In this case, a process of inferring a prediction direction of each partition from signaling information for motion vector prediction may be included.

When a first partition and a second partition have the same prediction direction, a motion vector of the first partition may be forced as a motion vector in a L0 direction, a motion vector of the second partition may be forced as a motion vector in a L1 direction, and the motion vectors of the first partition and second partition may be stored in a motion vector buffer. Alternatively, conversely, the motion vector of the first partition may be forced as a motion vector in the L1 direction, the motion vector of the second partition may be forced as a motion vector in the L0 direction, and the motion vectors of the first partition and second partition may be stored in the motion vector buffer. When the motion vector is forced as the motion vector in the L0 direction, it means that if a motion vector of a corresponding partition corresponds to the L0 direction, a motion vector in the L0 direction is used as it is; otherwise, a motion vector in the L1 direction is changed to a motion vector in the L0 direction. The change may include at least one of a process of inverting a (x,y) coordinate value of a motion vector based on an origin or a process of scaling using a predetermined coding parameter (e.g., reference picture index, POC information of a reference picture). However, in forcing to the bidirectional motion vector, when a current slice is a slice that does not support bidirectional prediction, a method for storing unidirectional motion vector information to be described later may be used.

Signaling information for the motion vector prediction may mean information on which motion vector prediction value (mvp) in a motion vector prediction list is used for a first partition and a second partition. The signaling information for the motion vector prediction may include information transmitted in the form of an index, and may mean information on which a prediction candidate among motion vector prediction candidates is used for the first partition and the second partition. In addition, it includes determining a division type of a current block and a motion vector prediction candidate corresponding to both a first partition and a second partition by using one index information. In addition, a method of using the motion vector prediction candidate as it is by using one signaled index information may be used, and a method of additionally signaling one signaled index information and a motion vector difference with a motion vector prediction candidate corresponding thereto may also be used.

The method of using the motion vector prediction candidate as it is may be referred to as a SKIP mode or a merge mode, and the method of additionally signaling the motion vector difference with the motion vector prediction candidate may be referred to as a motion vector prediction mode (AMVP mode).

In this case, the motion vector difference may be transmitted for each of a first partition and a second partition, or may be transmitted by configuring the first partition and the second partition as one bidirectional differential motion vector.

In storing the motion vectors of the first partition and the second partition, when a current slice is a slice that does not allow bidirectional prediction, it may be stored by dividing one block into two. In this case, a motion vector buffer corresponding to a current block may be bi-divided in consideration of size information of a current block, and the motion vectors of the first partition and the second partition may be stored in the bi-divided buffer, respectively. For example, by dividing a width and a height of a motion vector buffer corresponding to a current block into two, a motion vector of a first partition may be stored in a part of the buffer, and a motion vector of a second partition may be stored in the rest of the buffer. According to an embodiment of the present disclosure, when a current block is a 16×8 block, the current block may be divided into two 8×8 blocks, and a motion vector of a first partition and a motion vector of a second partition may be respectively stored in a corresponding motion vector buffer. As in the above embodiment, sizes of N and M may be compared for an N×M block. When N is larger than M, N may be divided into two, and a motion vector may be stored in a motion vector buffer corresponding to each partition. On the other hand, when M is larger than N, M may be divided into two and a motion vector may be stored in a motion vector buffer corresponding to each partition.

Alternatively, a current block may be composed of a plurality of n*m sub-blocks. Herein, the sub-block may mean a unit for storing a motion vector. n and m may be 4 or 8. n and m may be predetermined fixed values in an encoding/decoding apparatus or may be determined according to a size/shape of a current block. The sub-block may be square or non-square. The current block may include a sub-block (hereinafter referred to as a first area) belonging only to a first partition PART_0, a sub-block (hereinafter referred to as a second area) belonging only to a second partition PART_1, and a sub-block (hereinafter referred to as a third area) positioned on a diagonal line.

In this case, a motion vector of a first partition may be stored in the first area, and a motion vector of a second partition may be stored in the second area. As described above, each partition may have only a motion vector of unidirectional prediction.

Meanwhile, motion vectors mvL0 and mvL1 for bidirectional prediction may be stored in the third area. Herein, a motion vector for bidirectional prediction may be generated by a combination of a motion vector mv1 of a first partition and a motion vector mv2 of a second partition. For example, a motion vector in a L0 direction among mv1 and mv2 may be allocated to mvL0, and a motion vector in a L1 direction among mv1 and mv2 may be allocated to mvL1. However, this assumes that prediction directions of the first partition and the second partition are different from each other.

Embodiment 1

However, if prediction directions of a first partition and a second partition are the same, in the third area, either a motion vector mv1 of the first partition or a motion vector mv2 of the second partition may be selectively stored.

For example, either a motion vector mv1 of a first partition or a motion vector mv2 of a second partition may be selectively stored according to a division type of a current block. In other words, when the current block is divided by a left diagonal line, the motion vector mv1 of the first partition may be stored in the third area; otherwise, the motion vector mv2 of the second partition may be stored in the third area. Conversely, when the current block is divided by a left diagonal line, the motion vector (mv2) of the second partition may be stored in the third area; otherwise, the motion vector (mv1) of the first partition may be stored in the third area.

Alternatively, regardless of a division type of the current block, only the motion vector mv1 of the first partition may be forced to be stored in the third area, or only the motion vector mv1 of the second partition may be stored in the third area Alternatively, a motion vector to be stored in the third area may be determined in consideration of at least one of encoding information of the first partition and/or the second partition or a division type of the current block. In this case, the encoding information may be a reference picture index, a merge candidate index, a vector size value, or the like.

For example, a motion vector of a partition corresponding to the minimum value among a reference picture index refIdx1 of the first partition and a reference picture index refIdx2 of the second partition may be selectively stored. Conversely, a motion vector of a partition corresponding to the maximum value among the two reference picture indices may be selectively stored. In this case, when the reference picture index refIdx1 of the first partition and the reference picture index refIdx2 of the second partition are the same, a process of storing a motion vector of either the first partition or the second partition may be performed according to the diagonal division direction. In addition, when the reference picture index refIdx1 of the first partition and the reference picture index refIdx2 of the second partition are the same, a process of selectively storing a motion vector using encoding information, such as comparison of merge candidate indices, may be performed.

Embodiment 2

When prediction directions of the first partition and the second partition are the same, a process of converting the prediction directions may be further performed. For example, when prediction of both the first partition and the second partition is L0 prediction, one of two motion vectors in a L0 direction may be allocated to mvL0 and the other may be allocated to mvL1. Alternatively, when prediction of both the first partition and the second partition is L1 prediction, one of two motion vectors in a L1 direction may be allocated to mvL1 and the other may be allocated to mvL0. In this way, even when prediction directions of partitions are the same, motion vectors for bidirectional prediction may be generated through transformation of the prediction direction and stored in the third area.

Hereinafter, a motion compensation method of the aforementioned diagonal motion division will be described. The embodiments to be described below will be described on the premise that a current block is encoded using a merge mode, but this does not limit a type of an inter mode, and this may be applied in the same/similar manner to a SKIP mode, AMVP mode, affine mode, and the like.

FIG. 8 is a diagram illustrating a merge mode-based inter prediction method according to an embodiment to which the present disclosure is applied.

Referring to FIG. 8, a merge candidate list of a current block may be constructed (S800).

A current block may be determined through at least one of block division methods described in FIGS. 3 to 6. A current block may have a square or non-square shape. A current block may be divided into two partitions through diagonal division. At least one of the two partitions may be a triangular partition.

A merge candidate list may include at least one of a spatial merge candidate or a temporal merge candidate of a current block.

Motion information of a spatial merge candidate may be derived from motion information of a spatial neighboring block of a current block. Herein, the spatial neighboring block is a block belonging to the same picture as the current block, and may mean a block adjacent to the current block. The spatial neighboring block may include a block adjacent to at least one of a left, top, top-right, bottom-left, or top-left of the current block. The top-left neighboring block may be used only when at least one of the blocks adjacent to the left, top, top-right, and bottom-left is not available.

Motion information of a temporal merge candidate may be derived from motion information of a temporal neighboring block of a current block. The temporal neighboring block is a block belonging to a picture different from the current block, and may be defined as a block at the same location as the current block. Herein, the block at the same location may mean at least one of a block(BR) adjacent to a bottom-right corner of a current block, a block(CTR) including a location of a center sample of the current block, or a block(TL) including a location of a top-left sample of the current block.

Alternatively, the block at the same location may mean a block including a location shifted by a predetermined disparity vector from a location of a top-left sample of the current block. Herein, the disparity vector may be determined based on any one of the motion vectors of the spatial neighboring blocks described above. For example, the disparity vector may be set as a motion vector of a left neighboring block or a motion vector of a top neighboring block. Alternatively, the disparity vector may be determined based on a combination of at least two of the motion vectors of the spatial neighboring blocks described above. The combination may include a process of calculating a maximum value, a minimum value, a median value, and a weighted average value. For example, the disparity vector may be set as a median or average value between a motion vector of a left neighboring block and a motion vector of a bottom-left neighboring block.

A motion vector and a reference picture index of a temporal merge candidate may be derived from a motion vector and a reference picture index of the above-described temporal neighboring block, respectively. Alternatively, a motion vector of a temporal merge candidate may be derived as a motion vector of the temporal neighboring block, and a reference picture index of the temporal merge candidate may be set to a predetermined default value (e.g., 0) in a decoding apparatus regardless of the temporal neighboring block.

A method of generating a merge candidate list based on spatial/temporal merge candidates will be described in detail with reference to FIGS. 9 and 10.

A merge candidate list may further include at least one of a combined merge candidate or a merge candidate having a zero motion vector.

A combined merge candidate may be derived by combining n merge candidates belonging to a pre-generated merge candidate list. Herein, n may be an integer of 2, 3, 4 or more. The number n of merge candidates to be combined may be a predetermined fixed value in an encoding/decoding apparatus, or may be encoded and signaled by an encoding apparatus. The signaling may be performed in at least one unit of a sequence, a picture, a slice, a tile, a sub-tile (brick), or a predetermined block. The number n of merge candidates to be combined may be variably determined based on the number of remaining merge candidates. Herein, the number of remaining merge candidates may mean a difference between the maximum number of merge candidates that can be included in the merge candidate list and the current number of merge candidates in the merge candidate list. The maximum number may be a pre-promised number in an encoding/decoding apparatus, or may be encoded and signaled by an encoding apparatus. The current number may mean the number of merge candidates configured before adding a combined merge candidate. For example, when the number of remaining merge candidates is 1, two merge candidates are used, and when the number of remaining merge candidates is greater than 1, three or more merge candidates may be used.

The positions of the n merge candidates may be predetermined positions in a merge candidate list. For example, indices (0 to (k−1)) may be allocated for each merge candidate belonging to a merge candidate list. Herein, k may mean the total number of merge candidates included in the merge candidate list. In this case, the positions of the n merge candidates may correspond to index 0 to index (n−1) in the merge candidate list. For example, when n=2, a merge candidate to be combined may be derived using only a first merge candidate (index=0) and a second merge candidate (index=1) in a merge candidate list.

Alternatively, the n merge candidates may be determined in consideration of a prediction direction of each merge candidate included in a merge candidate list. For example, among merge candidates belonging to a merge candidate list, only a merge candidate that is a bidirectional prediction may be selectively used, or only a merge candidate that is a unidirectional prediction may be selectively used.

A combined merge candidate may be derived using both a spatial merge candidate and a temporal merge candidate, or may be derived using only one of the spatial merge candidate or the temporal merge candidate.

The combined merge candidate may be added after a spatial/temporal merge candidate in a merge candidate list. In other words, an index of the combined merge candidate may be greater than an index of the spatial/temporal merge candidate. Alternatively, a combined merge candidate may be added between a spatial merge candidate and a temporal merge candidate in a merge candidate list. In other words, an index of the combined merge candidate may be greater than an index of the spatial merge candidate and less than an index of the temporal merge candidate. Alternatively, a location of a combined merge candidate may be variably determined in consideration of a prediction direction of the combined merge candidate. A location of a combined merge candidate in a merge candidate list may be rearranged depending on whether a prediction direction of the combined merge candidate is bidirectional prediction. For example, when a combined merge candidate is bidirectional prediction, an index less than an index of a spatial or temporal merge candidate may be allocated; otherwise, an index greater than the index of the spatial or temporal merge candidate may be allocated.

Hereinafter, for convenience of description, a method of deriving a combined merge candidate based on two merge candidates will be described.

Motion information of a combined merge candidate may be derived by a weighted average of motion information of a first merge candidate and a second merge candidate. For example, motion information in a LX direction of a combined merge candidate may be derived by a weighted average of motion information in a LX direction of a first merge candidate and motion information in a LX direction a second merge candidate (X=0 or 1). However, a reference picture index of a LX direction of a combined merge candidate may be derived as a reference picture index of a LX direction of either a first merge candidate or a second merge candidate. For example, a reference picture index in a LX direction of a combined merge candidate may be derived using only a reference picture index in a LX direction of a first merge candidate. Here, the first merge candidate may have an index less than the second merge candidate.

Weights of the weighted average are [1:1], [1:2], [1:3], or [2:3], but is not limited thereto. The weights may be predefined in an encoding/decoding apparatus or derived from a decoding apparatus. In this case, the weights may be derived by considering at least one of a distance between a current picture and a reference picture of a merge candidate or a prediction direction of the merge candidate.

Alternatively, motion information in a L0 direction of a combined merge candidate may be derived from motion information in a L0 direction of a first merge candidate, and motion information in a L1 direction the combined merge candidate may be derived from motion information in a L1 direction of a second merge candidate. Conversely, motion information in a L0 direction of a combined merge candidate may be derived from motion information in a L0 direction of a second merge candidate, and motion information in a L1 direction of the combined merge candidate may be derived from motion information in a L1 direction of a first merge candidate.

In the present embodiment, the above-described motion information includes at least one of a prediction direction flag, a reference picture index, or a motion vector, and may be interpreted in the same manner in an embodiment described later.

Referring to FIG. 8, motion information of a current block may be derived from a merge candidate list (S810).

Specifically, a merge index of a current block may be signaled. A merge index may be information encoded to specify any one of a plurality of merge candidates included in a merge candidate list. The merge index may be signaled based on a flag indicating whether motion compensation based on diagonal motion division is performed. For example, when the flag indicates that motion compensation based on diagonal motion division is performed (i.e., when the flag is a first value), the merge index may be signaled; otherwise, the merge index may not be signaled. The flag is as described in FIG. 5, and a detailed description thereof will be omitted.

The merge index may be signaled for each of a first partition and a second partition of a current block (Embodiment 1). Motion information of a first partition may be derived using motion information of a merge candidate having the same index as a signaled merge index (mergeIdx1) of the first partition. When a signaled merge index (mergeIdx2) of a second partition is less than the mergeIdx1, motion information of the second partition may be derived using motion information of a merge candidate having the same index as the mergeIdx2. On the other hand, when the mergeIdx2 is greater than or equal to the mergeIdx1, motion information of a second partition may be derived using motion information of a merge candidate having the same index as (mergeIdx2+1).

Alternatively, one merge index (mergeIdx) may be signaled for a current block (Embodiment 2). In other words, a first partition and a second partition belonging to a current block may share the signaled mergeIdx. Motion information of first and second partitions may be derived based on motion information of a merge candidate specified by the mergeIdx.

For example, when a merge candidate specified by the mergeIdx is bi-directional prediction, the corresponding merge candidate may have motion information in a L0 direction and motion information in a L1 direction. In this case, motion information of a first partition may be derived from one of the motion information in the L0 direction and the motion information in the L1 direction, and motion information of a second partition may be derived from the other. On the other hand, when the merge candidate specified by the mergeIdx is not bidirectional prediction, motion information of a first partition may be derived from motion information of the merge candidate specified by the mergeIdx, and motion information of a second partition may be derived from motion information of a merge candidate specified by (mergeIdx+k). Herein, k may be an integer having an absolute value of 1, 2, 3, or more.

Alternatively, motion information of first and second partitions may be derived based on motion information of a pre-promised merge candidate in a merge candidate list (Embodiment 3). In this case, signaling of a merge index may be omitted. The pre-promised merge candidate may be a merge candidate having an index of 0. Motion information of first and second partitions may be derived in consideration of whether a merge candidate having an index of 0 is bidirectional prediction, as described in the second embodiment. Alternatively, the pre-promised merge candidate may be a merge candidate having the smallest index among merge candidates that are bidirectional prediction. Merge candidates that is bi-directional prediction may include at least one of a spatial/temporal merge candidate or a combined merge candidate. Motion information of first and second partitions is derived based on motion information of a merge candidate, which is a bidirectional prediction, as described in the second embodiment.

Motion information for each partition may be derived based on any one of the above-described embodiments 1 to 3, or motion information for each partition may be derived based on a combination of at least two of the first to third embodiments.

In the case of diagonal motion division, it may be limited to perform only unidirectional prediction in order to reduce memory bandwidth.

In consideration of whether a merge index of a diagonal motion divided partition is an even number or an odd number, the corresponding partition may be forced to perform only unidirectional prediction (Embodiment 4).

For example, when a merge index (mergeIdx1) of a first partition is an even number (e.g., 0, 2, 4, 6, etc.), motion information of the first partition may be derived using motion information in a L0 direction of a merge candidate corresponding to the mergeIdx1. However, the merge candidate corresponding to the mergeIdx1 may not have motion information in the L0 direction. In this case, the motion information of the first partition may be derived using motion information in a L1 direction of the corresponding merge candidate. On the other hand, when a merge index (mergeIdx1) of a first partition is an odd number (e.g., 1, 3, 5, etc.), motion information of the first partition may be derived using motion information in a L1 direction of a merge candidate corresponding to the mergeIdx1. However, the merge candidate corresponding to the mergeIdx1 may not have motion information in the L1 direction. In this case, the motion information of the first partition may be derived using motion information of the corresponding merge candidate in a L0 direction. The merge index (mergeIdx1) may be encoded and signaled by an encoding apparatus, derived based on a signaled merge index, or pre-promised to a decoding apparatus. Motion information of a second partition may be derived in the same manner as the aforementioned first partition, and a detailed description thereof will be omitted.

Alternatively, if a merge index (mergeIdx1) of a first partition is an even number (e.g., 0, 2, 4, 6, etc.), motion information of the first partition is derived using motion information in a L1 direction of a merge candidate corresponding to the mergeIdx1; otherwise, the motion information of the first partition may be derived using motion information in a L0 direction of the merge candidate corresponding to the mergeIdx1.

Alternatively, depending on a position of a diagonal motion divided partition, the corresponding partition may be forced to perform only unidirectional prediction (embodiment 5).

For example, a first partition of a current block is forced to refer only to motion information in a L0 direction of a merge candidate specified by a merge index (mergeIdx1), a second partition may be forced to refer only to motion information in a L1 direction of a merge candidate specified by a merge index (mergeIdx2). However, when the merge candidate specified by the mergeIdx1 does not have motion information in the L0 direction (i.e., in the case of L1 prediction), motion information in the L1 direction of a corresponding merge candidate may be referenced. Likewise, when the merge candidate specified by the mergeIdx2 does not have motion information in the L1 direction (i.e., in the case of L0 prediction), motion information in the L0 direction of a corresponding merge candidate may be referenced.

Unidirectional prediction may be forced based on at least one of the above-described embodiment 4 or 5, which will be described in detail with reference to FIGS. 11 to 13.

Referring to FIG. 8, inter prediction of a current block may be performed using derived motion information (S820).

A prediction pixel of a current block may be obtained using one of a first reference block $P_{P0}$ specified by a motion vector of a first partition or a second reference block $P_{P1}$ specified by a motion vector of a second partition. In this case, the prediction pixel may be obtained by applying predetermined weights to a first pixel in the first reference block and a second pixel in the second reference block. Herein, the first pixel and the second pixel may be at the same position as the prediction pixel.

For example, a prediction block (P CUR) of a current block according to the present disclosure may be obtained as shown in Equation 3 below.

$$P_{CUR}(x,y) = (P_{P0}(x,y) \times MASK_{P0}(x,y) + P_{P1}(x,y) \times MASK_{P1}(x,y) + \text{offset}) \gg \text{shift} \quad \text{[Equation 3]}$$

$P_{P0}$ and $P_{P1}$ denote prediction blocks predicted by different motions, $MASK_{P0}(x,y)$ and $MASK_{P1}(x,y)$ denote weights at a (x,y) coordinate, and a sum of $MASK_{P0}(x,y)$ and $MASK_{P1}(x,y)$ must be equal to $2^{shift}$. The offset may be 0 or $2^{(shift-1)}$.

On the other hand, in the case of diagonal motion division, a pixel P(x1,y1) located on a diagonal line may be predicted by a weighted sum of a pixel at a (x1,y1) position in a first partition and a pixel at a (x1,y1) position in a second partition. Likewise, a neighboring pixel P(x2,y2) of the pixel P(x1,y1) is predicted by a weighted sum of a pixel at a position (x2,y2) in a first partition and a pixel at a position (x2,y2) in a second partition. The weighted prediction will be described in detail with reference to FIGS. 14 to 17.

FIG. 9 shows merge candidates of a block using left diagonal motion division.

FIG. 9 shows a current block using left diagonal motion division and a block spatially/temporally adjacent to the current block. In FIG. 9, a current block 900 is a block divided using left diagonal motion division, and may include a first division block 910 and a second division block 920. Each of the first and second division blocks 910 and 920 may independently perform motion prediction and motion compensation, and may generate one prediction block corresponding to the current block 900.

The first division block 910 and the second division block 920 may use the same merge candidate list generated based on a square or non-square current block, as described in FIG. 8.

In addition, when diagonal motion division is applied to a current block, since the first division block 910 and the second division block 920 have different motion characteristics, the first division block 910 and the second division block 920 may use different motion prediction and merge candidates.

As shown in FIG. 9, the first division block 910 may have a low correlation with left neighboring blocks A0 and A1 among spatial neighboring blocks of the current block 900. In this case, A0 and A1 may be excluded when constructing a merge candidate list of the first division block 910. In addition, motion information of a temporal neighboring block C0 corresponding to a bottom-right position of the current block 900 and motion information of a temporal neighboring block C4 corresponding to a top-right position of the current block 900 may be used as additional merge candidates.

In constructing a merge candidate list, when the number of merge candidates does not reach to the maximum number, an additional merge candidate list may be constructed by combining merge candidates included in the merge candidate list, and a merge candidate list may also be generated using a merge candidate having a zero motion vector.

As shown in FIG. 9, the second division block 920 has a low correlation with top neighboring blocks B0 and B1 among spatial neighboring blocks of the current block 900. In this case, B0 and B1 may be excluded when constructing a merge candidate list of the second division block 920. In addition, motion information of a temporal neighboring block C0 corresponding to a bottom-right position of the current block 900 and motion information of a temporal neighboring block C5 corresponding to a top-left position of the current block 900 may be used as additional merge candidates.

In constructing a merge candidate list, when the number of merge candidates does not reach to the maximum number, an additional merge candidate list may be constructed by combining merge candidates included in the merge candidate list, and a merge candidate list may also be generated using a merge candidate having a zero motion vector.

FIG. 10 shows merge candidates of a block using right diagonal motion division.

FIG. 10 shows a current block using right diagonal motion division and a block spatially/temporally adjacent to a current block. In FIG. 10, a current block 1000 is a block divided using right diagonal motion division, and may include a first division block 1010 and a second division block 1020. Each of the first and second division blocks 1010 and 1020 may independently perform motion prediction and motion compensation, and may generate one prediction block corresponding to the current block 1000.

The first division block 1010 and the second division block 1020 may use the same merge candidate list generated based on a square or non-square current block, as shown in FIG. 8.

In addition, when diagonal motion division is applied to the current block, since the first division block 1010 and the second division block 1020 have different motion characteristics, the first division block 1010 and the second division block 1020 may use different motion prediction and merge candidates.

As shown in FIG. 10, the first division block 1010 has a low correlation with a bottom-left neighboring block A0 and a top-right neighboring block B0 among spatial neighboring blocks of the current block 1100. In this case, the bottom-left and top-right neighboring blocks A0 and B0 may be excluded when constructing a merge candidate list of the first division block 1010. In addition, motion information of a temporal neighboring block C2 corresponding to a top-left position of the current block 1000 and motion information of a temporal neighboring block C3 corresponding to a top-left position of the current block 1000 may be used as additional merge candidates.

In constructing a merge candidate list, when the number of merge candidates does not reach to the maximum number, an additional merge candidate list may be constructed by combining merge candidates included in the merge candidate list, and a merge candidate list may also be generated using a merge candidate having a zero motion vector.

As shown in FIG. 10, the second division block 1020 has a low correlation with a left neighboring block A1, a top neighboring block B1, and a top-left neighboring block B2 among spatial neighboring blocks of a current block 1000. In this case, A1, B1, and B2 may be excluded when constructing a merge candidate list of the second partitioning block 1020. In addition, motion information of a temporal neighboring block C0 corresponding to a bottom-right position of the current block 1000, motion information of a temporal neighboring block C1 corresponding to a center position of the current block 1000 and motion information of a temporal neighboring block C6 corresponding to a bottom-right position of the current block 1000 may be used as additional merge candidates.

In constructing a merge candidate list, when the number of merge candidates does not reach to the maximum number, an additional merge candidate list may be constructed by combining merge candidates included in the merge candidate list, and a merge candidate list may also be generated using a merge candidate having a zero motion vector.

Figure 11:
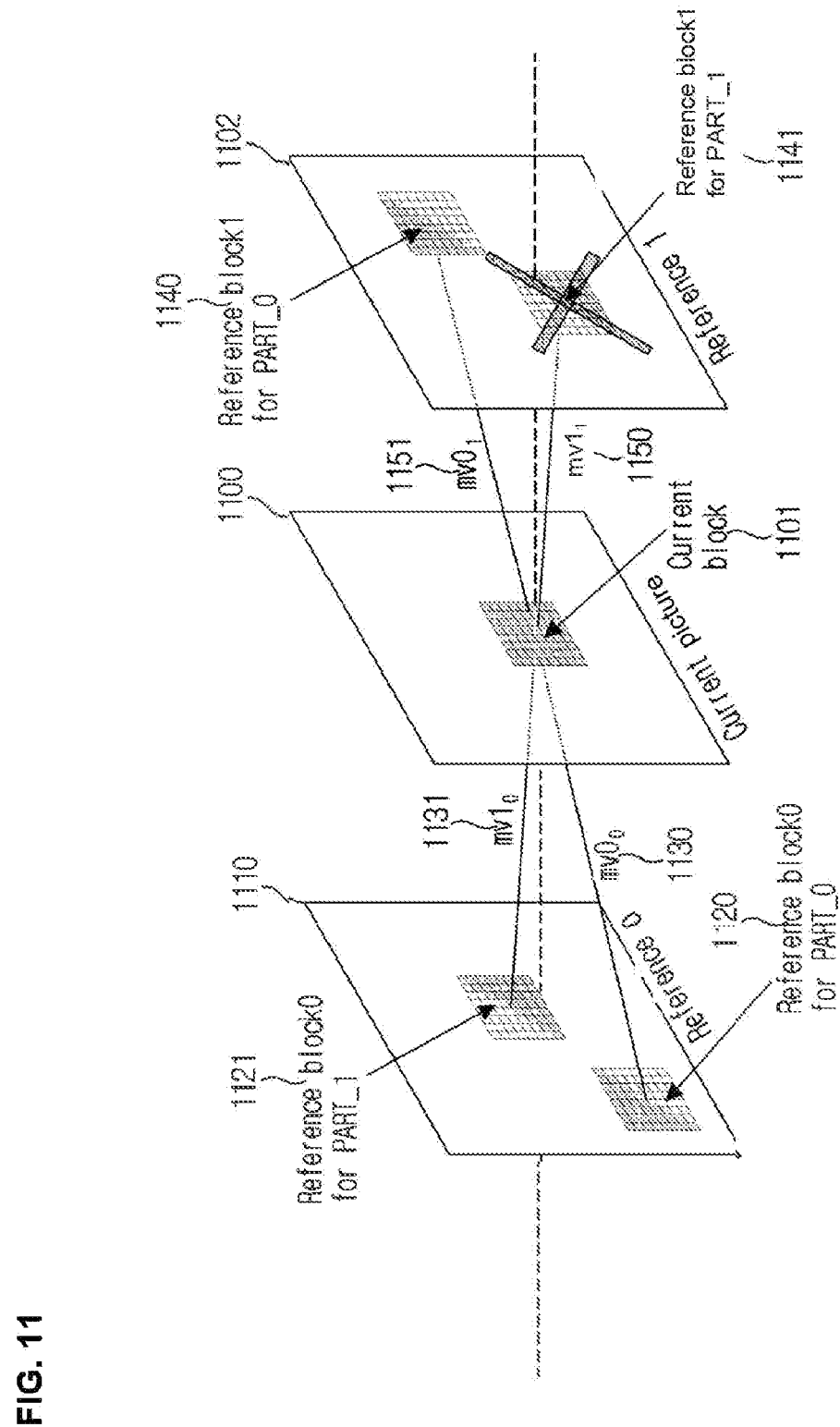
FIG. 11 is a diagram illustrating a concept of a limited mask-based motion prediction and compensation according to an embodiment to which the present disclosure is applied.

FIG. 11 is a diagram illustrating a concept of a limited mask-based motion prediction and compensation according to an embodiment to which the present disclosure is applied.

In particular, FIG. 11 is a diagram illustrating a method of limiting a prediction direction according to a specific condition in order to reduce memory bandwidth in performing mask-based motion prediction and compensation proposed in the present disclosure.

When a width or height of a current block is less than or equal to a predetermined threshold size, a prediction direction of the current block may be limited. Herein, the threshold size may be 4, 8, 16 or more.

Alternatively, when a mode for a current block is a predetermined inter mode, a prediction direction of the current block may be limited. Herein, the predetermined inter mode may include at least one of a SKIP mode, a merge mode, an AMVP mode, or an affine mode. For example, in the merge mode, bidirectional prediction may be possible, and in the AMVP mode, only unidirectional prediction may be possible. In addition, an inter mode may be limited according to each partition of a current block. For example, when a first partition PART_0 is coded using a merge mode, a second partition PART_1 may be restricted so that it cannot be coded using the merge mode. However, when the first partition PART_0 is not coded using the merge mode, the second partition PART_1 may be coded using the merge mode.

In addition, even when one block is divided into two partitions through diagonal motion division and motion information for two partitions is transmitted as one index, the method of limiting the prediction direction may be applied.

When two pieces of motion information for two partitions are transmitted as one index, at least one of the two motion information may be motion information for performing unidirectional prediction.

Figure 12:
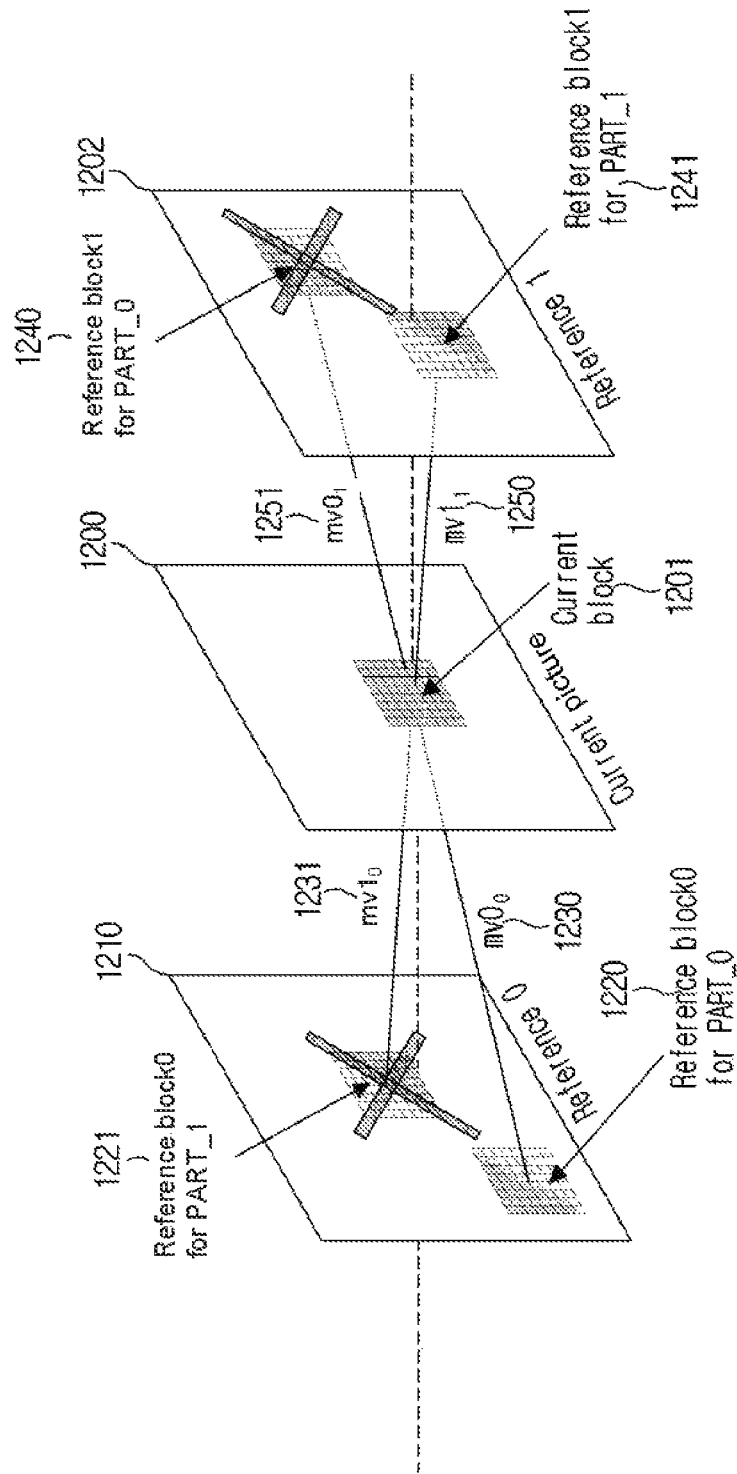
FIGS. 12 and 13 are diagrams illustrating a concept of a method of performing prediction by dividing one coding block into two partitions using one straight line as an embodiment to which the present disclosure is applied.
Figure 13:
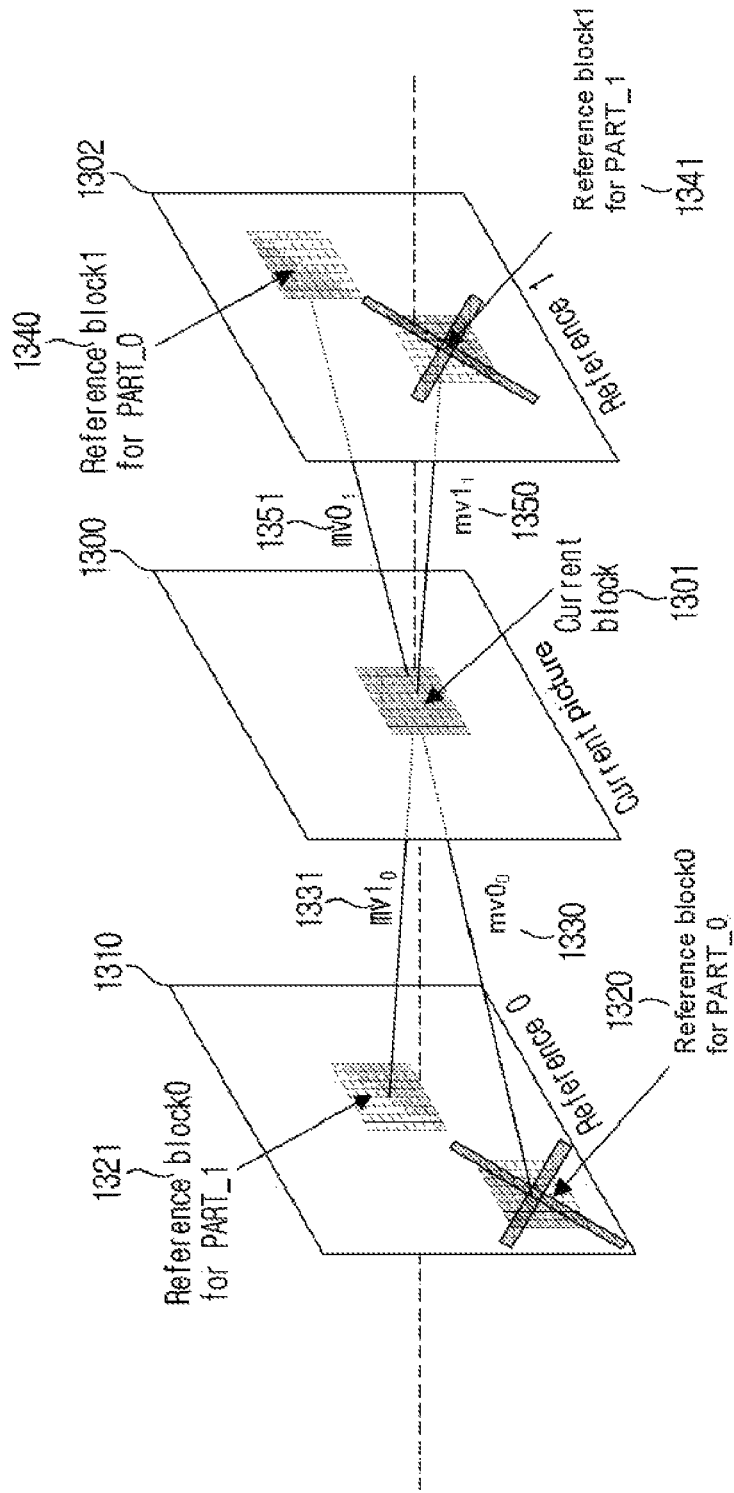

FIGS. 12 and 13 are diagrams illustrating a concept of a method of performing prediction by dividing one coding block into two partitions using one straight line as an embodiment to which the present disclosure is applied.

In an embodiment in which one coding block is divided into two partitions using one straight line, FIG. 12 shows an embodiment in which one square or non-square block is divided into triangular shapes based on a straight line connecting a top-right and a bottom-left of the block. In the present disclosure, not only a triangular shape divided based on a straight line connecting the top-right and the bottom-left, but also a triangular shape divided based on a straight line connecting the top-left and the bottom-right may be included. In addition, the present disclosure may include a case in which one coding block is divided into two partitions in a vertical/horizontal direction, and in this case, the two divided partitions may have the same width or height. In addition, the present disclosure may include a case of dividing one coding block into two partitions based on an arbitrary straight line.

As shown in FIG. 12, a current block 1201 is divided based on a straight line connecting a top-right and a bottom-left of the block. In this case, each partition may perform bidirectional prediction or unidirectional prediction. However, in order to reduce memory bandwidth, it may be limited to perform only unidirectional prediction. In this case, for a case where it is forced to use only unidirectional prediction, the present disclosure proposes a method and an apparatus for performing prediction by referring to reference pictures in different directions for each partition. In other words, when a first partition performs L0 prediction, a second partition may essentially perform L1 prediction. Referring to FIG. 12, a first partition performs prediction with reference to a reference picture in a L0 direction, and a second partition performs prediction with reference to a reference picture in a L1 direction.

Referring to FIG. 13, a first partition performs prediction with reference to a reference picture in a L1 direction, and a second partition performs prediction with reference to a reference picture in a L0 direction.

In the present disclosure, an embodiment in which a first partition and a second partition refer to different reference picture lists are illustrated in FIGS. 12 and 13. However, the present disclosure may also include performing prediction for the first partition and the second partition by referring to the same reference picture list.

FIGS. 14 to 17 are diagrams illustrating a weighted prediction method for a current block to which diagonal motion division is applied as an embodiment to which the present disclosure is applied.

Referring to FIG. 14, a weight of 2 may be applied to a pixel position belonging to a first partition, and a weight of 1 may be applied to a pixel position located on a diagonal line. However, by applying a weight of 0 to a pixel position belonging to a second partition, an effect of not referring to the pixel at the corresponding position can be obtained.

Similarly, a weight of 2 may be applied to a pixel position belonging to a second partition, and a weight of 1 may be applied to a pixel position located on a diagonal line. However, a weight of 0 may be applied to a pixel position belonging to a first partition.

A final prediction pixel may be obtained by summing two co-located pixels to which the weights are applied, and dividing it by a sum of the corresponding weights.

The above-described method is referred to as a mask-based motion prediction and compensation method, and can be extended and used in various types of mask types. When the diagonal motion division shown in FIG. 14 is configured in the form of a mask, it is as shown in Equation 4.

$$MASK_{P0}=2 \text{ (if } f(x,y)>0\text{), } 1 \text{ (if } f(x,y)=0\text{), } 0 \text{ (otherwise)} \quad \text{[Equation 4]}$$

$$MASK_{P1}=0 \text{ (if } f(x,y)>0\text{), } 1 \text{ (if } f(x,y)=0\text{), } 2 \text{ (otherwise)} \quad \text{[Equation 4]}$$

$MASK_{P0}$ denotes a weight of a first partition, and $MASK_{P1}$ denotes a weight of a second partition.

Using the weight of Equation 4, an equation for generating a final prediction block is as in Equation 5.

$$P_{DMP}(x,y)=(P_{P0}(x,y) \times MASK_{P0}(x,y)+P_{P1}(x,y) \times MASK_{P1}(x,y)) \gg shift \quad \text{[Equation 5]}$$

$P_{DMP}$ denotes a final square or non-square prediction block obtained using diagonal motion division, $P_{P0}(x,y)$ denotes a reference pixel corresponding to a (x,y) position in a first partition, and $P_{P1}(x,y)$ denotes a reference pixel corresponding to a (x,y) position in a second partition, respectively. Shift is a final shift value according to a weight, and since a weight shown in FIG. 14 is 2, a shift value is 1.

In this case, a sum of weights for each position of mask generated using a diagonal line proposed by the present disclosure is not limited to 2, and may be an exponential value of 2 such as 4, 8, 16, 32, etc.

Figure 15:
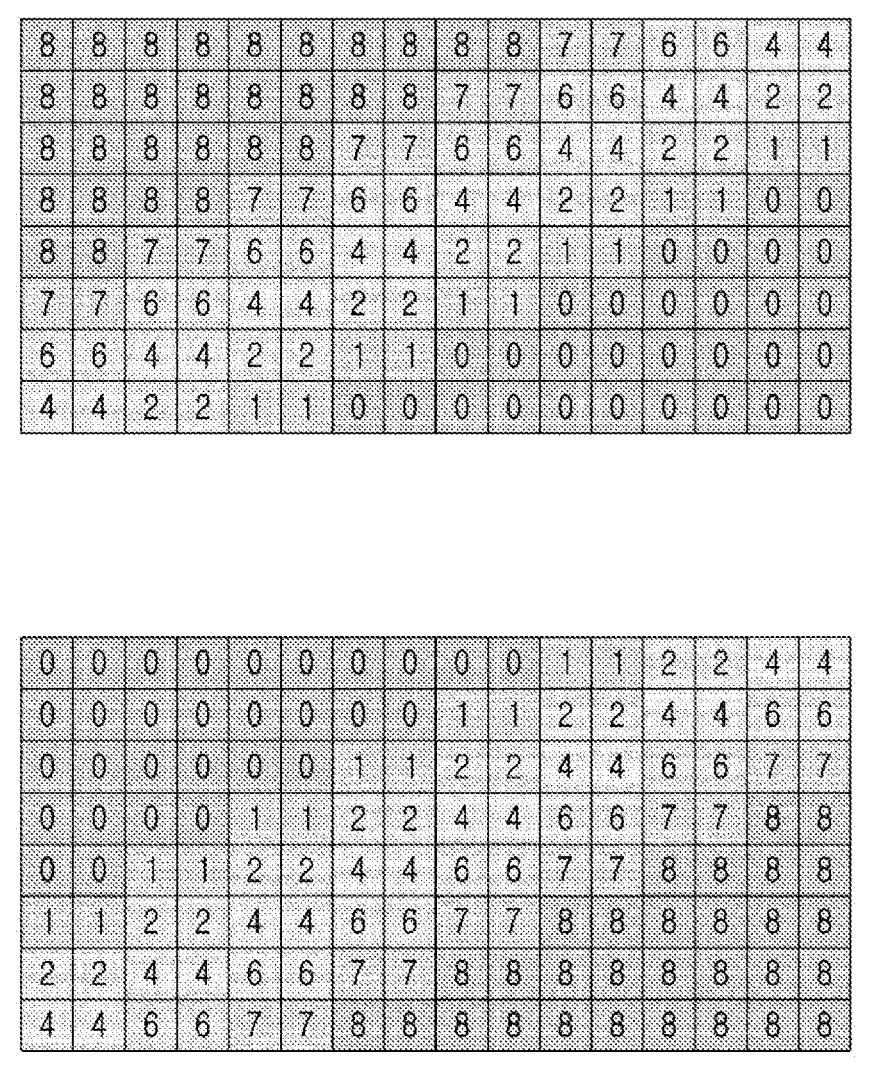

FIG. 15 shows an embodiment in which a sum of weights applied for each pixel is 8. Referring to FIG. 15, by applying different weights to a pixel located on a diagonal line of a current block as well as a pixel in a region adjacent to the diagonal line, it is possible to reduce boundary deterioration that may occur at boundaries of diagonal motion division. The adjacent region may include two pixels adjacent to a top or left of the pixel located on the diagonal line and two pixels adjacent to a bottom or right of the pixel located on the diagonal line.

Specifically, a pixel P(x1, y1) (hereinafter referred to as a first area) located on a diagonal line may be predicted by applying a weight of 4 to a pixel at a position (x1,y1) in a reference block of a first partition and a pixel at a position (x1,y1) in a reference block of a second partition, respectively. A top or left neighboring pixel P(x2, y2) (hereinafter referred to as a second area) of the first area may be predicted by applying a weight of 6 to a pixel at a position (x2,y2) in a reference block of a first partition and applying a weight of 2 to a pixel at a position (x2,y2) in a reference block of a second partition. A top or left neighboring pixel P(x3, y3) (hereinafter referred to as a third area) of the second area may be predicted by applying a weight of 7 to a pixel at a position (x3,y3) in a reference block of a first partition and applying a weight of 1 to a pixel at a position (x3,y3) in a reference block of a second partition. A remaining pixel P(x4,y4) excluding the first to third areas from a first partition may be predicted by applying a weight of 8 to a pixel at a position (x4,y4) in a reference block of a first partition and applying a weight of 0 to a pixel at a position (x4,y4) in a reference block of a second partition.

On the other hand, a bottom or right neighboring pixel P(x5, y5) (hereinafter referred to as a fourth area) of the first area may be predicted by applying a weight of 2 to a pixel at a position (x5,y5) in a reference block of a first partition and applying a weight of 6 to a pixel at a position (x5,y5) in a reference block of a second partition. A bottom or right neighboring pixel P(x6, y6) (hereinafter referred to as a fifth area) of the fourth area may be predicted by applying a weight of 1 to a pixel at a position (x6,y6) in a reference block of a first partition and applying a weight of 7 to a pixel at a position (x6,y6) in a reference block of a second partition. A remaining pixel P(x7,y7) excluding the first area, the fourth area, and the fifth area from a second partition may be predicted by applying a weight of 0 to a pixel at a position (x7,y7) in a reference block of a first partition and applying a weight of 8 to a pixel at a position (x7,y7) in a reference block of a second partition.

FIG. 16 shows an embodiment in which a sum of weights applied for each pixel is 32, and it may be used when a block is more sharply divided compared to an embodiment in which a sum of weights is 8 shown in FIG. 15. As shown in FIG. 16, different weights may be applied for each predetermined area, which has been described in detail in FIG. 15, and a detailed description thereof will be omitted. Herein, the weights are any one of [32:0], [31:1], [28:4], [16:16], [4:28], [31:1], or [0:32], which can be selectively used according to a position of a pixel.

FIG. 17 shows an embodiment in which a sum of weights applied for each pixel is 8. Referring to FIG. 17, by applying different weights to a pixel located on diagonal line of a current block as well as a pixel in an area adjacent to the diagonal line, it is possible to reduce boundary deterioration that may occur at boundaries of diagonal motion division. The adjacent area may include one pixel adjacent to a top or left of the pixel located on the diagonal line and one pixel adjacent to a bottom or right of the pixel located on the diagonal line. As shown in FIG. 17, different weights may be applied for each predetermined area, which has been described in detail in FIG. 15, and a detailed description thereof will be omitted. Herein, the weights are any one of [8:0], [6:2], [4:4], [2:6], or [0:8], which can be selectively used according to a position of a pixel.

Various embodiments of the present disclosure do not list all possible combinations, but are for describing representative aspects of the present disclosure, and matters described in the various embodiments may be applied independently or may be applied in combination of two or more.

In addition, various embodiments of the present disclosure may be implemented by hardware, firmware, software, or a combination thereof. In the case of implementation by hardware, it can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontroller, microprocessor, etc.

The scope of the present disclosure includes software or machine-executable instructions (e.g., operating system, application, firmware, program, etc.) that allow An operation according to a method of various embodiments to be executed on a device or a computer, and a non-transitory computer-readable medium in which the software or instructions are stored and executed on a device or a computer.

INDUSTRIAL APPLICABILITY

The present disclosure may be used to encode/decode a video signal.

The invention claimed is:
1. A method of decoding an image, the method comprising:
constructing a merge candidate list of a current block;
deriving motion information of the current block based on the merge candidate list and a merge candidate index; and
performing inter prediction of the current block based on the derived motion information,
wherein, in response to a case where the current block is divided into two partitions, at least one of which has a triangular shape, a pixel of the current block is predicted by applying predetermined weights to a pixel belonging to a first reference block of the first partition and a pixel belonging to a second reference block of the second partition,
wherein the predetermined weights include a first weight to be applied to the first reference block and a second weight to be applied to the second reference block,
wherein each of the first and the second weights is one of 0, 1, 2, 4, 6, 7, or 8, and
wherein a sum of the first and second weights is equal to 8.

2. The method of claim 1,
wherein the merge candidate index is signaled for each of the two partitions.

3. The method of claim 2,
wherein whether to divide the current block into the two partitions, the at least one of which has the triangular shape, is derived based on a coding parameter, and
wherein the coding parameter includes a size of the current block.

4. The method of claim 3,
wherein the merge candidate list includes at least one of a spatial merge candidate, a temporal merge candidate, a combined merge candidate, or a merge candidate having a zero motion vector.

5. The method of claim 4,
wherein motion information of each of the two partitions is derived based on motion information of a merge candidate specified by the merge candidate index.

6. The method of claim 5,
wherein the weights are determined based on a position of the pixel of the current block.

7. A method of encoding an image, the method comprising:
constructing a merge candidate list of a current block; and
performing inter prediction of the current block based on motion information derived from the merge candidate list,
wherein a merge candidate index specifying a merge candidate in the merge candidate list is encoded into a bitstream,
wherein, in response to a case where the current block is divided into two partitions, at least one of which has a triangular shape, a pixel of the current block is predicted by applying predetermined weights to a pixel belonging to a first reference block of the first partition and a pixel belonging to a second reference block of the second partition,
wherein the predetermined weights include a first weight to be applied to the first reference block and a second weight to be applied to the second reference block,
wherein each of the first and the second weights is one of 0, 1, 2, 4, 6, 7, or 8, and
wherein a sum of the first and second weights is equal to 8.

8. A non-transitory computer-readable medium for storing data associated with an image signal, comprising:
a data stream stored in the non-transitory computer-readable medium, the data stream comprising a merge candidate index specifying a merge candidate in a merge candidate list for inter prediction of a current block,
wherein motion information of the current block is derived based on the merge candidate list and the merge candidate index,
wherein the inter prediction of the current block is performed based on the derived motion information, wherein, in response to a case where the current block is divided into two partitions, at least one of which has a triangular shape, a pixel of the current block is predicted by applying predetermined weights to a pixel belonging to a first reference block of the first partition and a pixel belonging to a second reference block of the second partition, wherein the predetermined weights include a first weight to be applied to the first reference block and a second weight to be applied to the second reference block, wherein each of the first and the second weights is one of 0, 1, 2, 4, 6, 7, or 8, and wherein a sum of the first and second weights is equal to 8.

* * * * *